(12) United States Patent
Yang et al.

(10) Patent No.: US 12,040,827 B2
(45) Date of Patent: Jul. 16, 2024

(54) CASE FOR ELECTRONIC DEVICE AND MAGNETIC ASSEMBLY

(71) Applicant: SHENZHEN LANHE TECHNOLOGIES CO., LTD., Guangdong (CN)

(72) Inventors: Hua Yang, Guangdong (CN); Yong Chen, Guangdong (CN); Liren Luo, Guangdong (CN); Jianhua Liu, Guangdong (CN); Zhengfeng Yang, Guangdong (CN); Zhijun Liang, Guangdong (CN); Churong Tang, Guangdong (CN); Haisong Qiu, Guangdong (CN); Zhuoting Ye, Guangdong (CN)

(73) Assignee: SHENZHEN LANHE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/098,727

(22) Filed: Jan. 19, 2023

(65) Prior Publication Data
US 2023/0299807 A1  Sep. 21, 2023

Related U.S. Application Data

(63) Continuation of application No. PCT/CN2023/072207, filed on Jan. 13, 2023.

(30) Foreign Application Priority Data

Mar. 11, 2022 (CN) .......................... 202220562453.3
Mar. 17, 2022 (CN) .......................... 202220591759.1
Aug. 1, 2022 (CN) .......................... 202222026765.5
Sep. 2, 2022 (CN) .......................... 202222350018.7
Dec. 5, 2022 (CN) .......................... 202223250397.9

(51) Int. Cl.
H04B 1/3888 (2015.01)

(52) U.S. Cl.
CPC .............................. *H04B 1/3888* (2013.01)

(58) Field of Classification Search
CPC .................................................. H04B 1/3888
See application file for complete search history.

(56) References Cited

U.S. PATENT DOCUMENTS

| 2011/0267748 | A1* | 11/2011 | Lane ........................ A45F 5/00 361/679.01 |
| 2021/0099031 | A1* | 4/2021 | Jol .......................... H02J 50/10 |
| 2022/0094379 | A1* | 3/2022 | Balderston ........... H04B 1/3877 |

(Continued)

*Primary Examiner* — Yuwen Pan
*Assistant Examiner* — Fatuma G Sherif
(74) *Attorney, Agent, or Firm* — Andrew C. Cheng

(57) ABSTRACT

The present disclosure provides a case for an electronic device and a magnetic assembly. The case includes a side wall, a back wall connected with the side wall to define a receiving cavity for receiving the electronic device, and a magnetic assembly, the magnetic assembly includes a support member connected with the side wall or the back wall, and a magnetic alignment member, the support member is capable of moving relative to the side wall or the back wall, so as to support the case, the magnetic alignment member is detachably or fixedly connected with the support member connected with the back wall or the side wall. The case of the present disclosure is convenient to use.

19 Claims, 43 Drawing Sheets

(56) References Cited

U.S. PATENT DOCUMENTS

| | | | |
|---|---|---|---|
| 2022/0117384 A1* | 4/2022 | Whitten | F16M 11/10 |
| 2023/0167940 A1* | 6/2023 | Lin | H04M 1/04 |
| | | | 361/679.21 |
| 2023/0223976 A1* | 7/2023 | Weng | H04B 1/3877 |
| | | | 455/575.8 |

* cited by examiner

CASE FOR ELECTRONIC DEVICE AND MAGNETIC ASSEMBLY

CROSS REFERENCE TO RELATED APPLICATIONS

The present application is a Continuation Application of PCT Application No. PCT/CN2023/072207 filed on Jan. 13, 2023, which claims the benefit of Chinese Patent Application Nos. 202220562453.3 filed on Mar. 11, 2022, 202220591759.1 filed on Mar. 17, 2022, 202222026765.5 filed on Aug. 1, 2022, 202222350018.7 filed on Sep. 2, 2022 and 202223250397.9 filed on Dec. 5, 2022. All the above are hereby incorporated by reference in their entirety.

FIELD

The present disclosure relates to the technical field of electronic devices, specifically to a case for an electronic device and a magnetic assembly.

BACKGROUND

Wireless charging devices have been developed to wirelessly charge portable electronic devices without the need for a charging cord. For example, some portable electronic devices can be recharged by merely resting the device on a charging surface of a wireless charging device. To enable efficient wireless charging, magnetic alignment members are placed in the electronic device and the wireless charging device, respectively.

Many users like to cover a protective case on the electronic devices which may negatively affect the magnetic alignment between the electronic device and the wireless charging device. Furthermore, the protective case may be used as a support for the electronic device.

SUMMARY

The present disclosure provides a case for an electronic device, which includes a side wall, a back wall connected with the side wall to define a receiving cavity for receiving the electronic device, and a magnetic assembly, the magnetic assembly includes a support member connected with the side wall or the back wall, and a magnetic alignment member, the support member is capable of moving relative to the side wall or the back wall, so as to support the case, the magnetic alignment member is detachably or fixedly connected with the support member.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
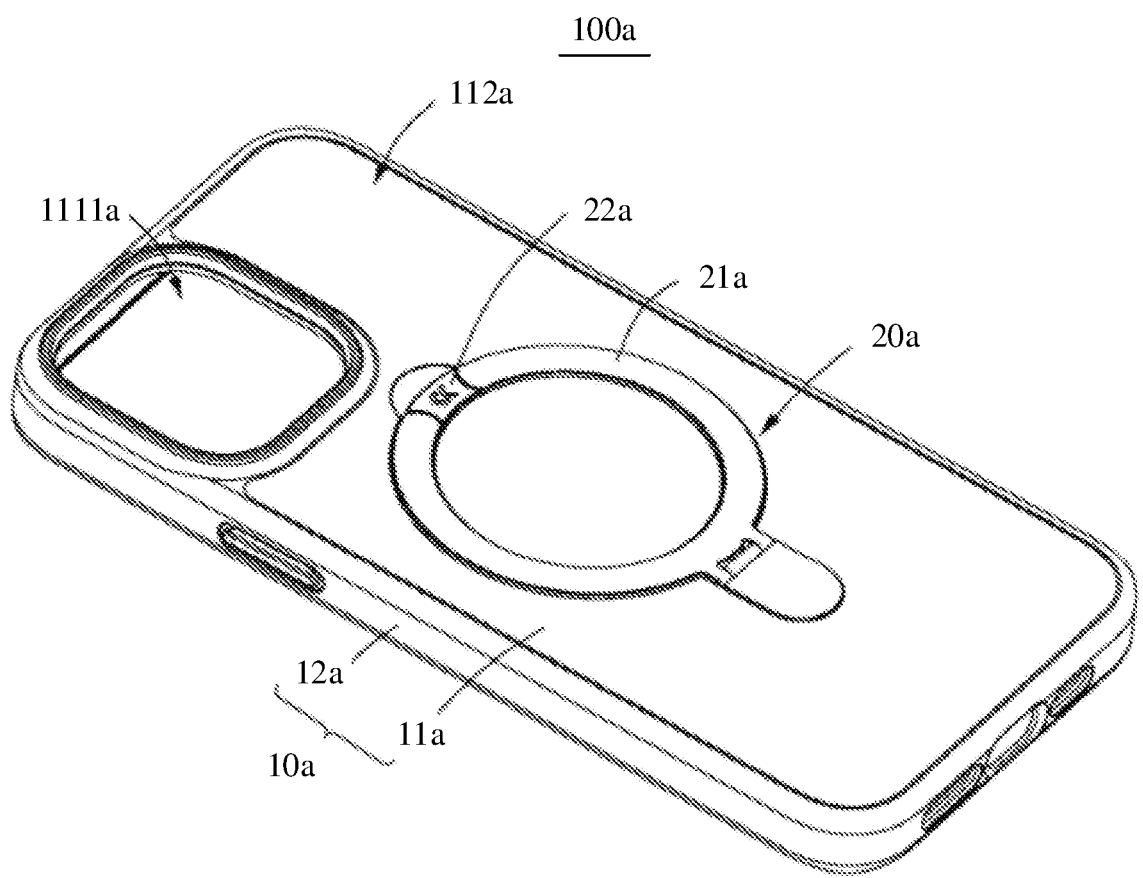
FIG. 1 is a structure diagram of a case according to a first embodiment of the present disclosure.
Figure 2:
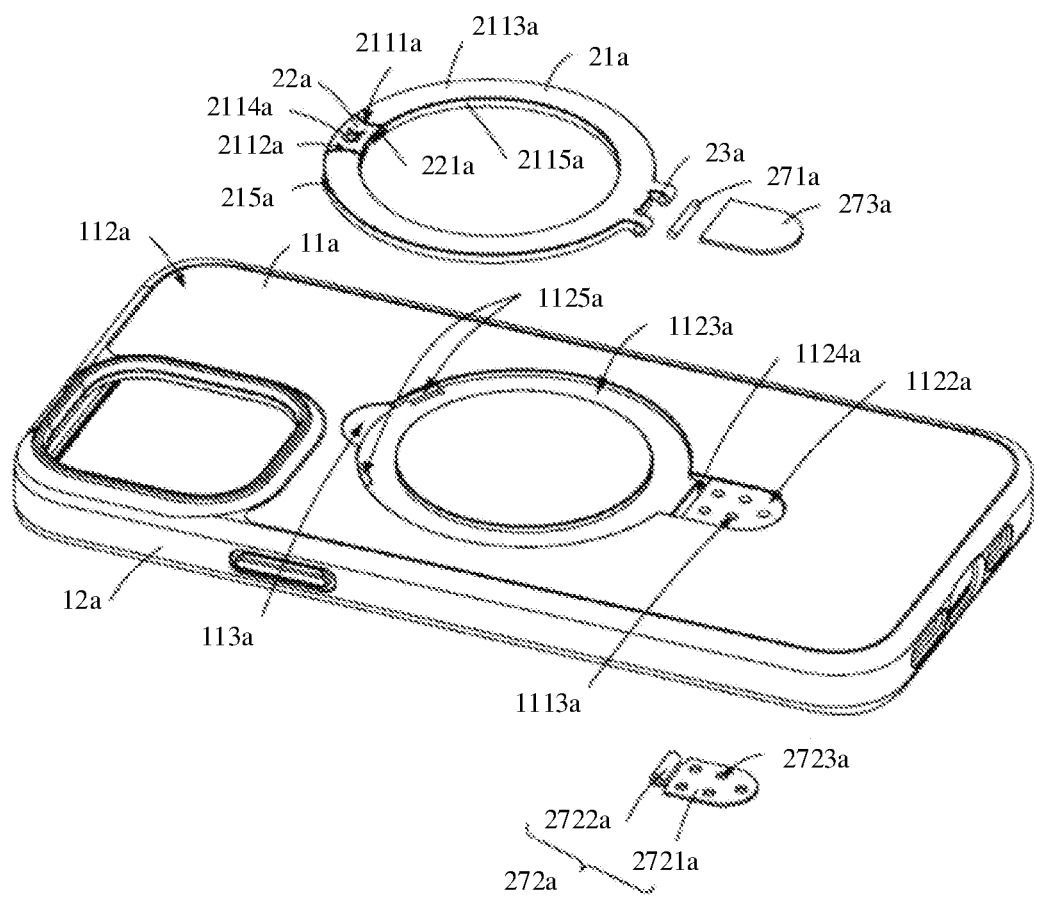
FIG. 2 is an exploded diagram of the case of FIG. 1.
Figure 3:
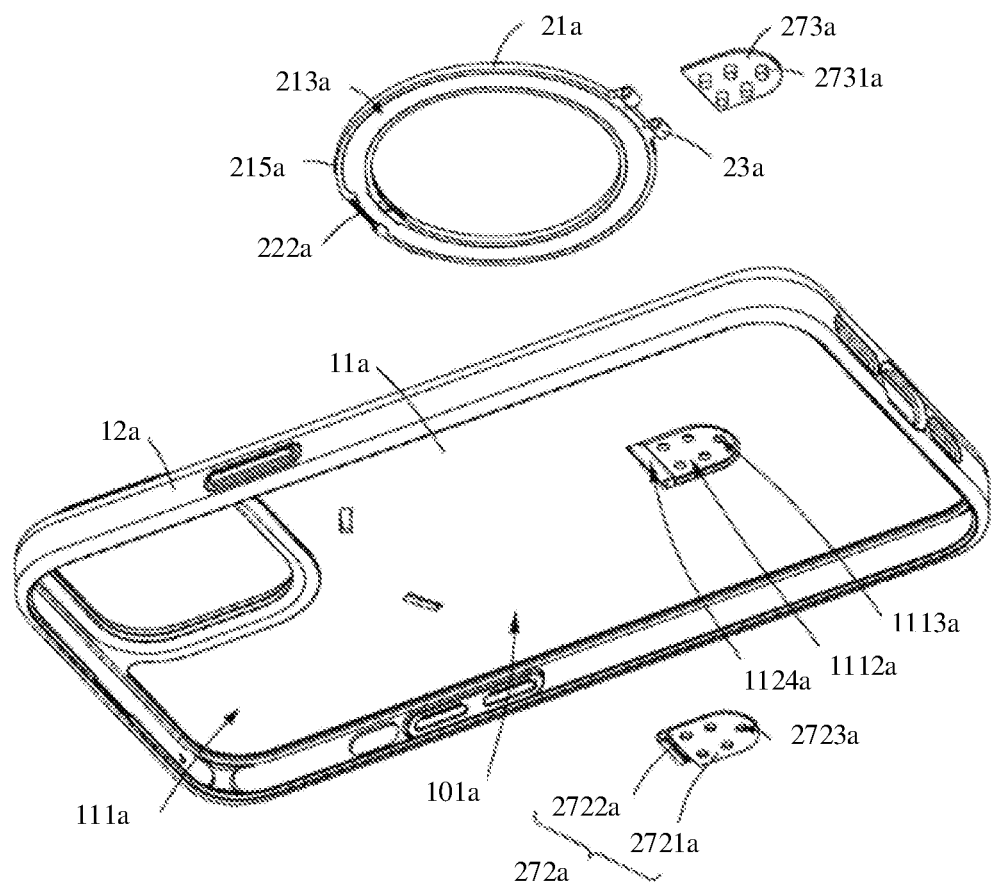
FIG. 3 is another exploded diagram of the case of FIG. 1.
Figure 4:
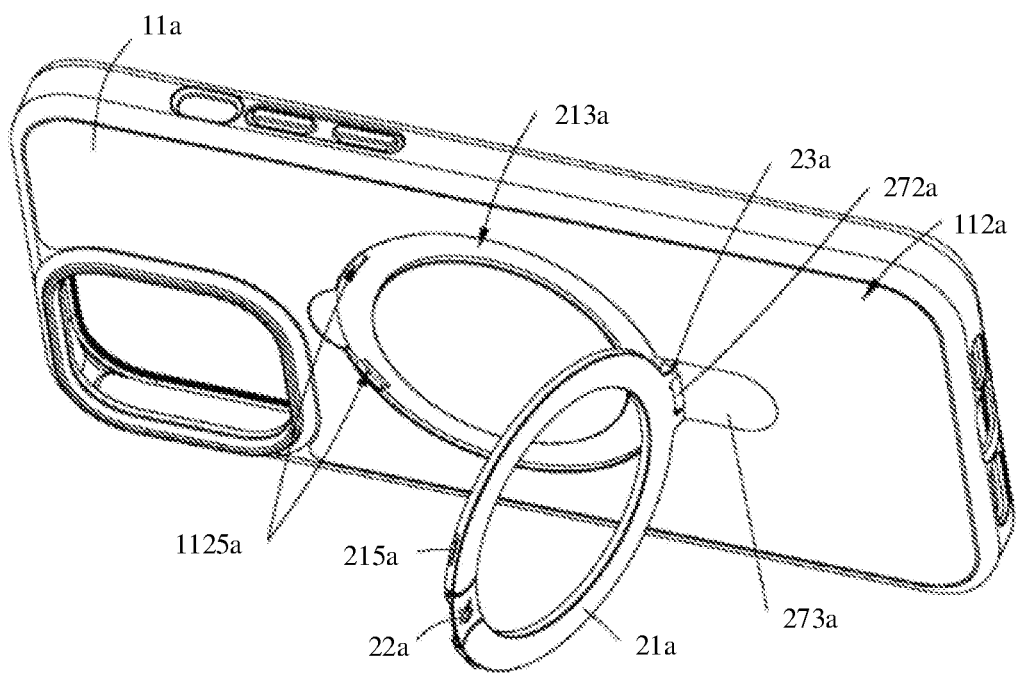
FIG. 4 a structure diagram of the case with a magnetic assembly in a unfolded state.
Figure 5:
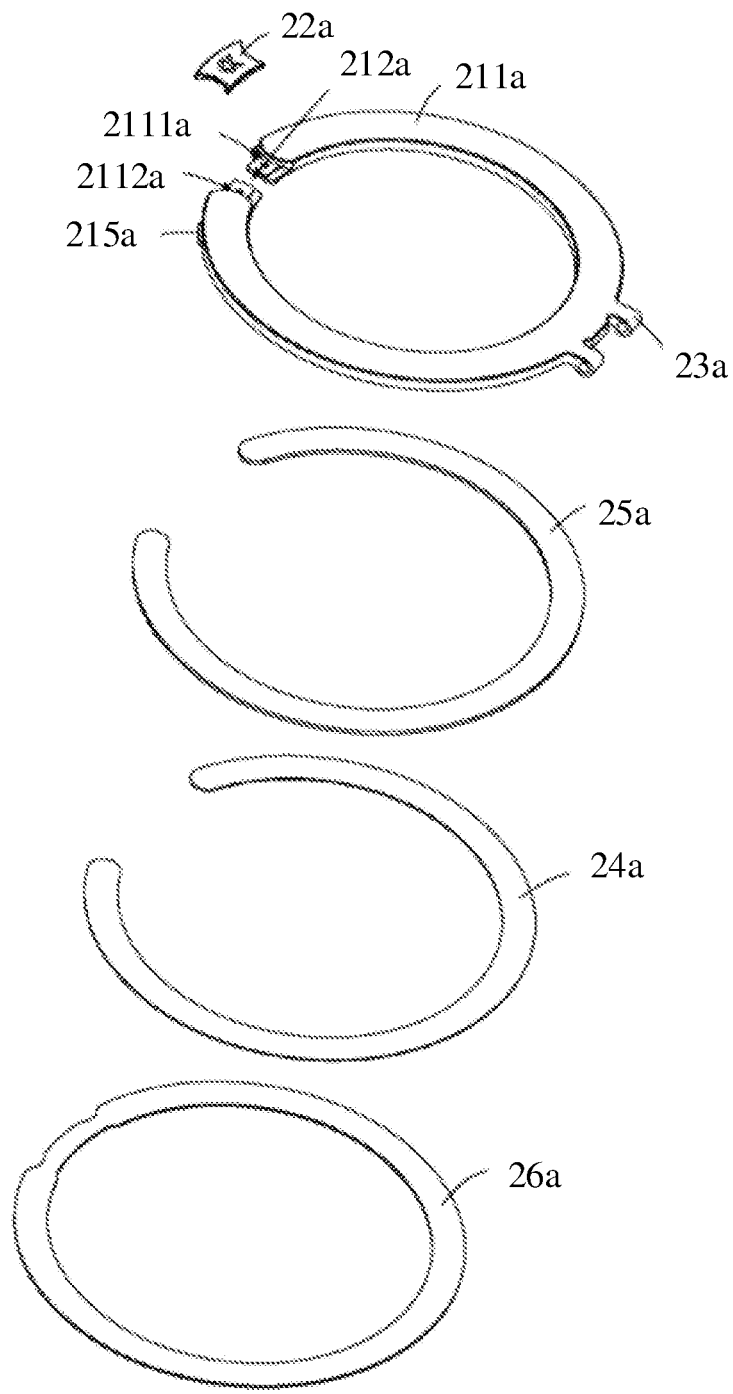
FIG. 5 is an exploded diagram of the magnetic assembly of FIG. 4.
Figure 6:
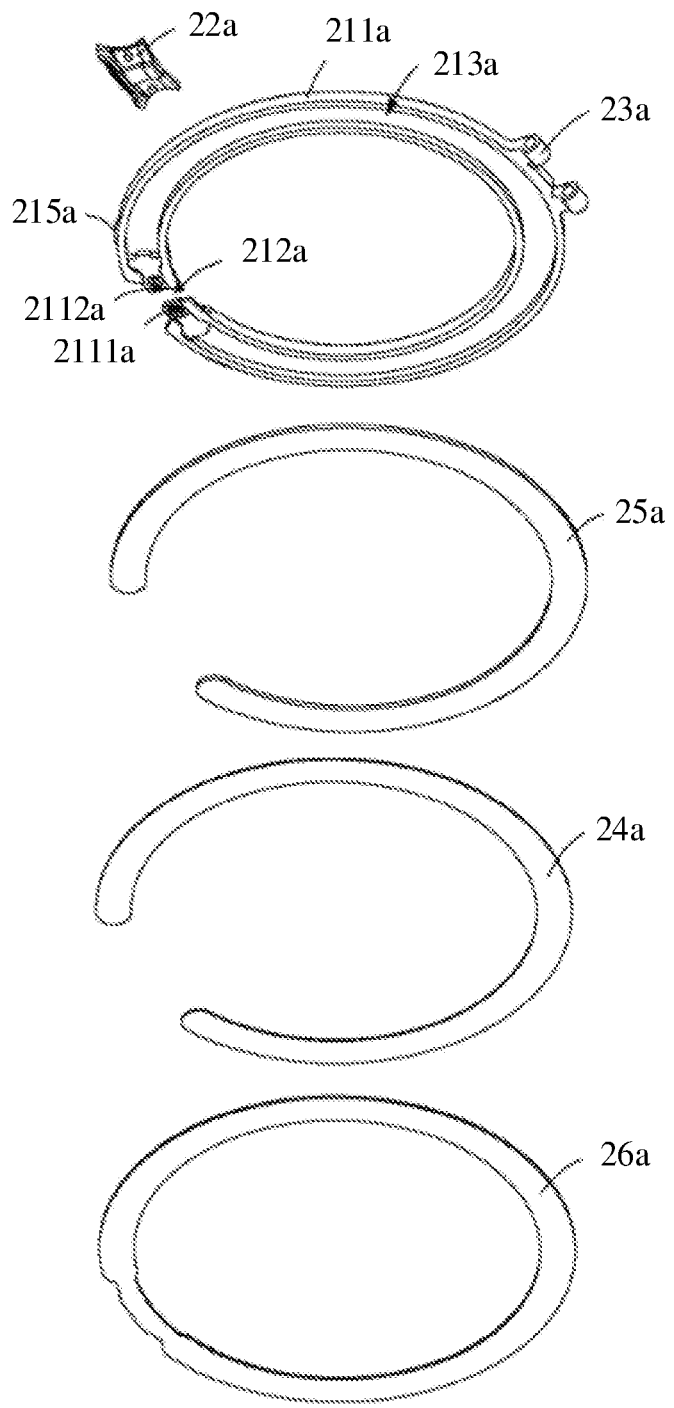
FIG. 6 is another exploded diagram of the magnetic assembly of FIG. 4.
Figure 7:
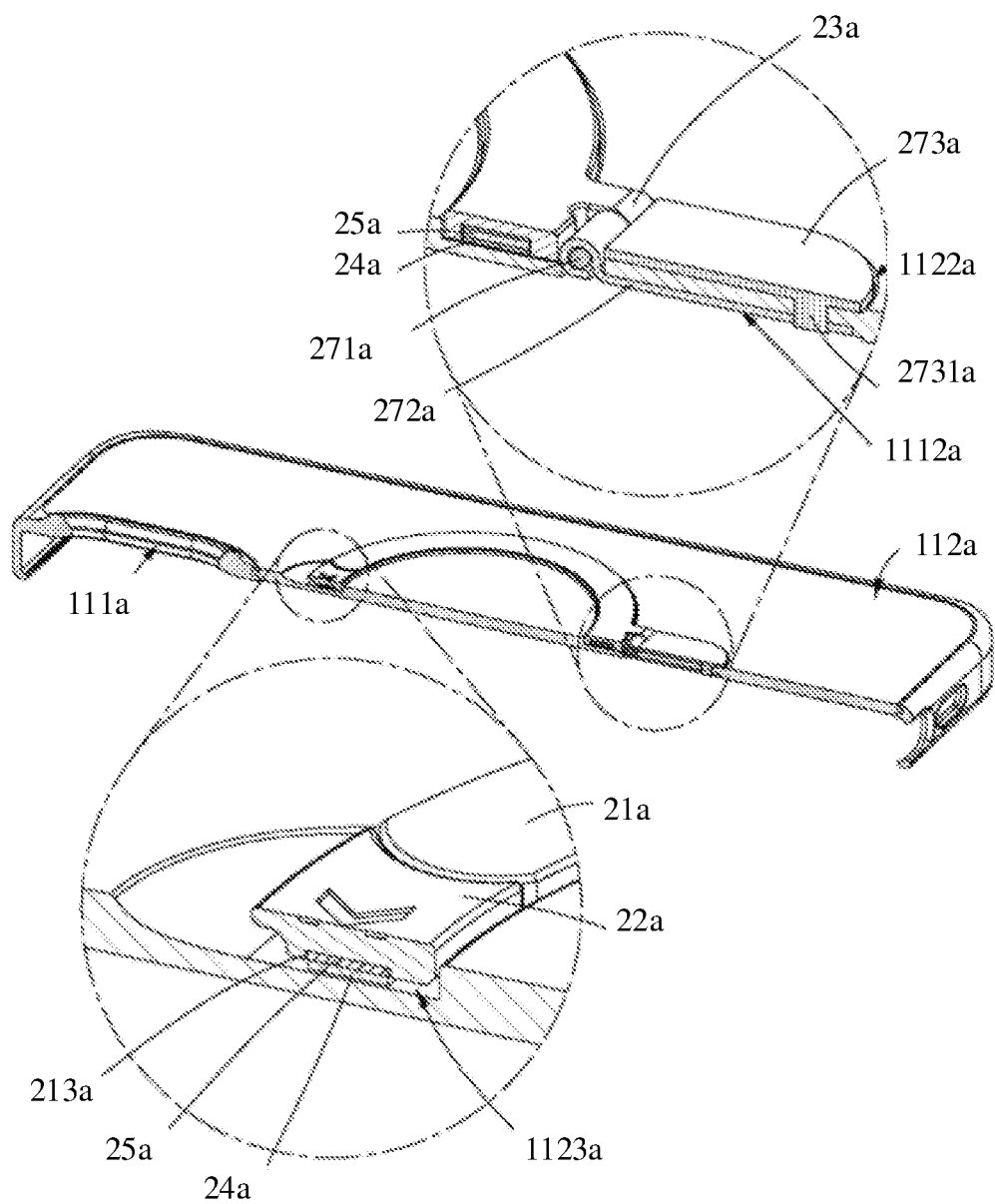
FIG. 7 is a cross sectional view of the case of FIG. 1.
Figure 8:
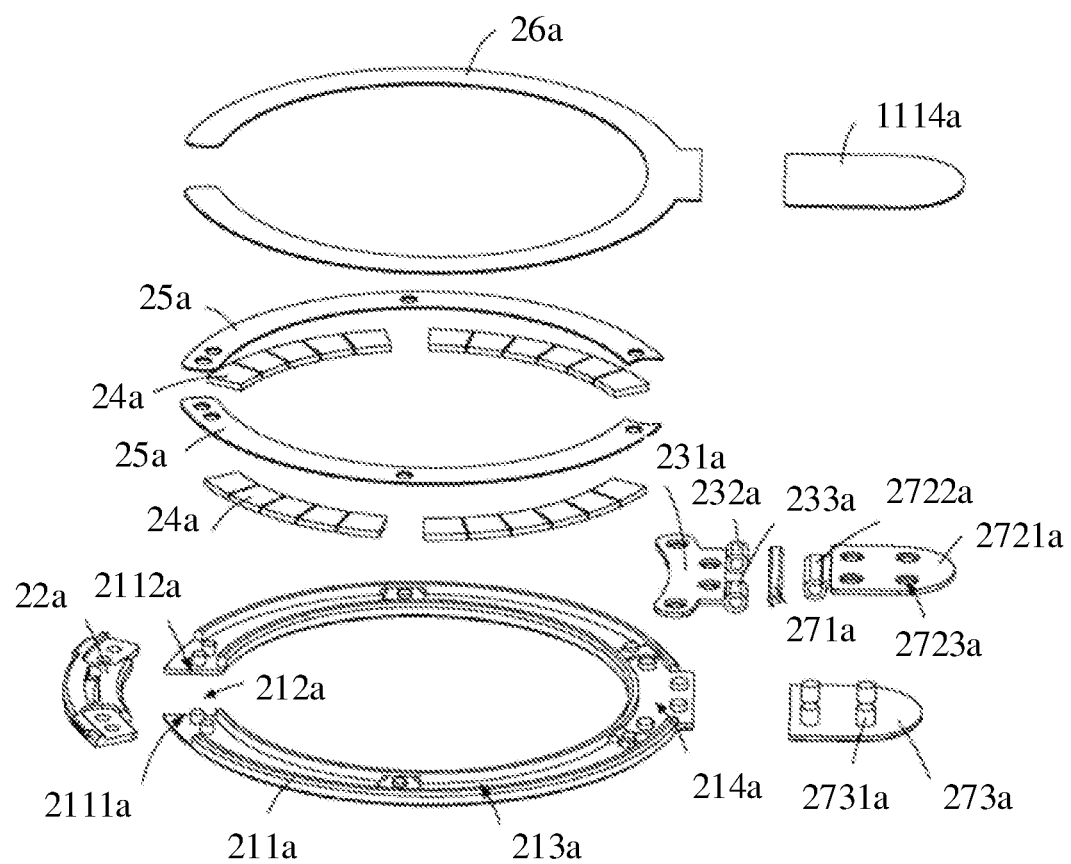
FIG. 8 an exploded diagram of the magnetic assembly, the first connecting member and the second connecting member of FIG. 4.
Figure 9:
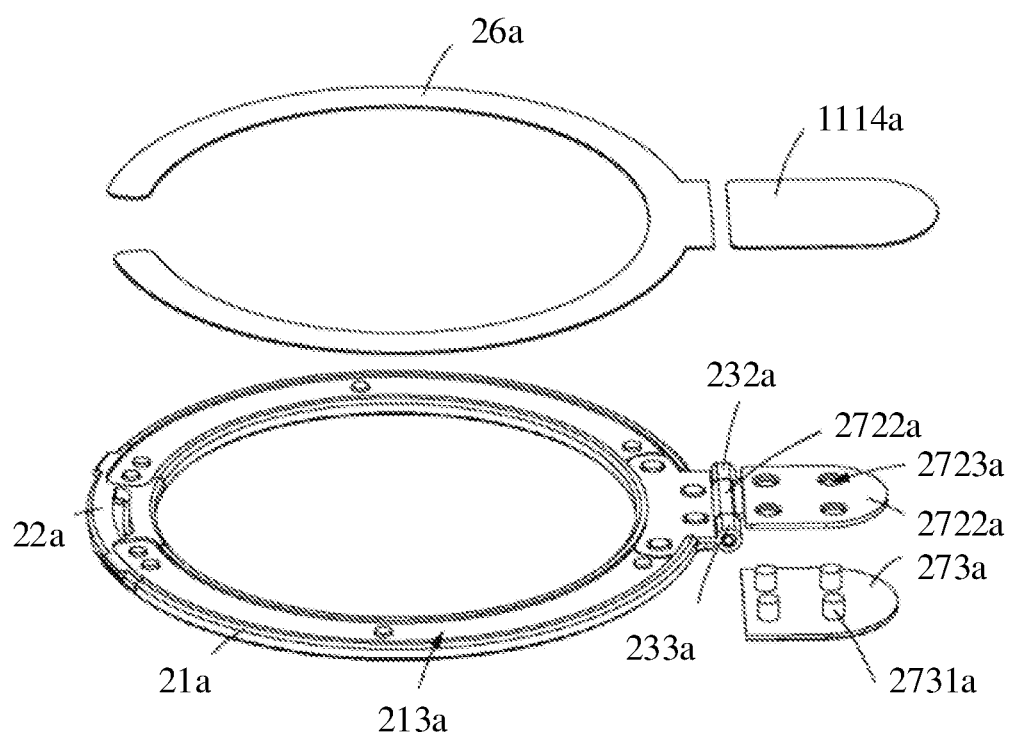
FIG. 9 another exploded structure diagram of the magnetic assembly, the first connecting member and the second connecting member of FIG. 4.
Figure 10:
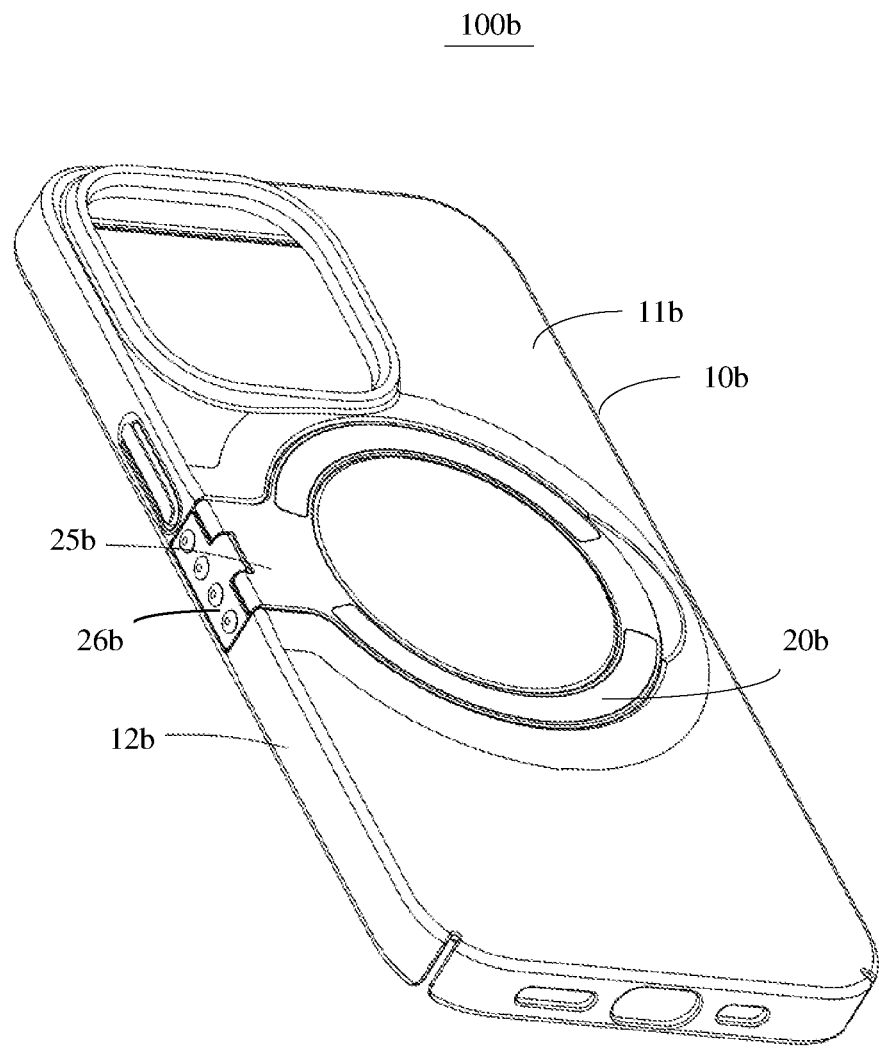
FIG. 10 is a structure diagram of a case according to a second embodiment of the present disclosure, a magnetic assembly is in a folded state.
Figure 11:
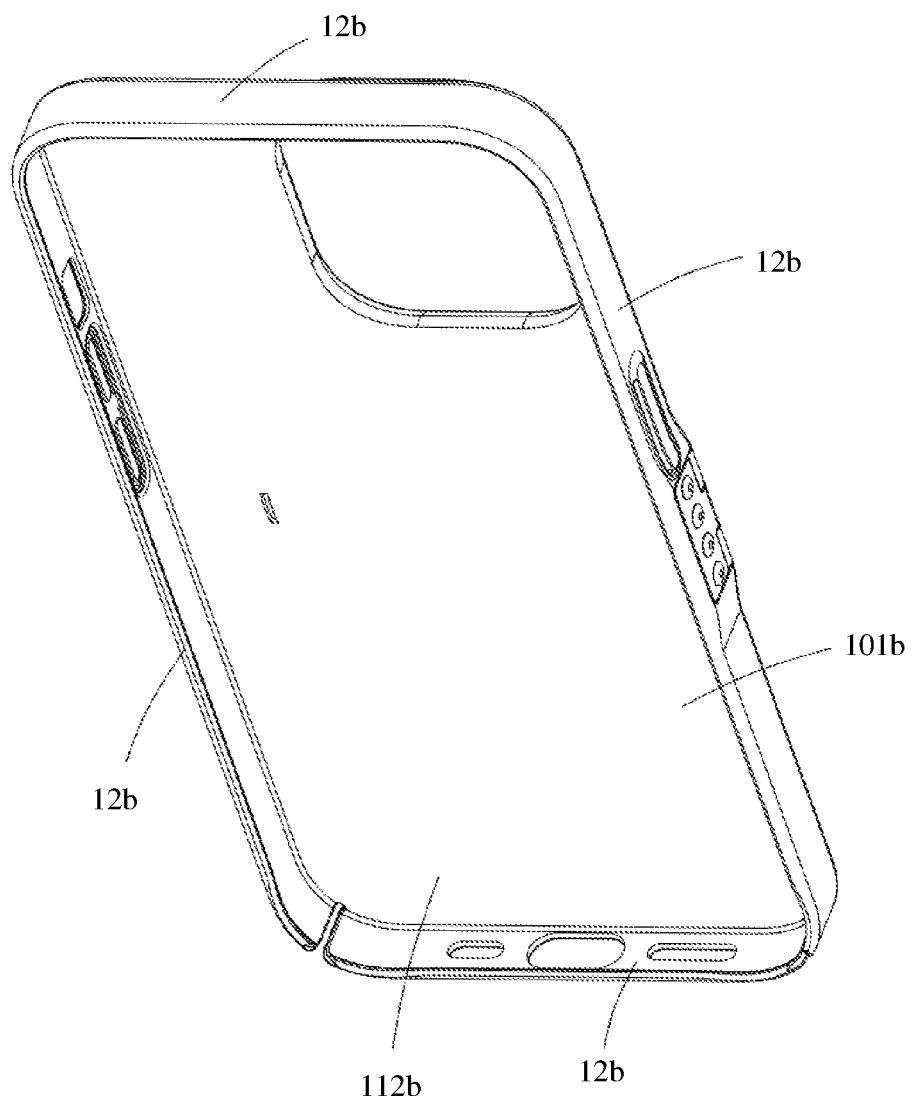
FIG. 11 is another structure diagram of the case of FIG. 10.

The realization of the aim, functional characteristics, advantages of the present disclosure are further described specifically with reference to the accompanying drawings and embodiments.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion in the so-described combination, group, series, and the like. the present disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

The present disclosure provides a case 100a according to a first embodiment. The case 100a is used to accommodate an electronic device and/or cooperate with an external wireless charger to wirelessly charge the electronic device. Optionally, the electronic device may be mobile phone, pad, and other mobile devices. The first embodiment takes the mobile phone as an example.

Referring to FIGS. 1-9, the case 100a includes a housing 10a configured for accommodating the mobile phone in the housing 10a, a magnetic assembly 20a configured for magnetically coupling to the mobile phone. The magnetic assembly 20a is rotatably connected with the housing 10a. The magnetic assembly 20a may rotate away from the housing 10a and form an angle with the housing 10a, to support the housing 10a. The magnetic assembly 20a can be used independently, and the magnetic assembly 20a can be attached with the housing 10a of the case 100a or attached with the mobile phone.

The magnetic assembly 20a includes a support member 21a, a magnetic alignment member 24a, a connecting member, and an isolating member 22a received in the support member 21a and/or the magnetic alignment member 24a. The connecting member includes a first connecting element 272a fixedly connected with the housing 10a, and a second connecting element 23a fixedly connected with the support member 21a, the second connecting element 23a is rotatably connected with the first connecting element 272a, to rotatably connect the magnetic assembly 20a with the housing 10a. It should be understood that, the second connecting element 23a can also be regarded as a part of the support member 21a, and the second connecting element 23a is rotatably connected with the first connecting element 272a, so as to rotatably connect the support member 21a with the connecting member.

In one embodiment, the housing 10a includes a back wall 11a and a side wall 12a, the side wall 12a is connected around an edge of the back wall 11a to form a first receiving cavity 101a, and the first receiving cavity 101a is used to accommodate the mobile phone. The back wall 11a defines a first opening 1111a corresponding to a camera of the mobile phone.

The magnetic alignment member 24a includes a material being capable of coupling with a magnet, such as magnet, or iron. The magnetic alignment member 24a is substantially aligned with a magnetic part of the electronic device. The magnetic alignment member 24a may include a plurality of sub magnetic alignment elements spaced apart from each other, and the sub magnetic alignment elements cooperatively form a substantially ring shape or a substantially arc shape.

A thickness of the magnetic alignment member 24a is 0.3-4 mm, and a thickness of the magnetic assembly 20a is 1-5 mm. An inner diameter of the magnetic alignment member 24a is 40-52 mm, and an inner diameter of the magnetic assembly 20a is about 38-50 mm. An outer diameter of the magnetic alignment member 24a is 48-60 mm, and an outer diameter of the magnetic assembly 20a is about 50-62 mm. The magnetic alignment member 24a defines a magnetic coupling area, a vertical distance between a center of the magnetic coupling area and a top edge of the back wall 11a is about 77-97 mm, and a horizontal distance between a center of the magnetic coupling area and a side edge of the back wall 11a is about 40-52 mm. At least a portion of the support member 21a is capable of rotating relative to the case or the electronic device to define an angle with the case or the electronic device, and the angle is 0-135°. It should be understood that, the inner diameter of the magnetic alignment member 24a is smaller than the outer diameter of the magnetic alignment member 24a, and the inner diameter of the magnetic assembly 20a is smaller than the outer diameter of the magnetic assembly 20a.

In one embodiment, the back wall 11a has a first surface 111a and a second surface 112a opposite to the first surface 111a. An inner wall of the first receiving cavity 101a defines a first connecting groove 1112a for mounting a part of the first connecting element 272a. The second surface 112a defines a receiving space 1123a configured for receiving the magnetic assembly 20a, and a second connecting groove 1122a, and the first connecting groove 1112a and the second connecting groove 1122a are configured for cooperatively mounting the first connecting element 272a, the receiving space 1123a may be a groove or a through hole. The back wall 11a further includes an operation portion 113a which can be a slot a groove, or a through hole communicated to the receiving space 1123a. Through the operation portion 113a, it is easy to turn the magnetic assembly 20a. Optionally, a wall of the second connecting groove 1122a defines a second opening 1124a passed through the first surface 111a and the second surface 112a, and the connecting member further includes a rotating element 271a received in the second opening 1124a, the magnetic assembly 20a is rotatably connected with the back wall 11a by the rotating element 271a.

The support member 21a has an open annular structure, the support member 21a is rotatably connected to the back wall 11a. When the magnetic assembly 20a is in a folded state, the support member 21a is received in the receiving space 1123a. The support member 21a includes a ring segment 211a, the ring segment 211a includes a first end 2111a and a second end 2112a, the first end 2111a and the second end 2112a are front and rear ends of the ring segment 211a, the first end 2111a and the second end 2112a are spaced apart from each other to define an open segment 212a which can be regarded as an isolating gap, the isolating member 22a is received in the open segment 212a, and the isolating member 22a is connected to the first end 2111a and the second end 2112a to form a closed ring. By setting the isolating member 22a, the influence of the support member 21a on wireless charging is reduced, and the interruption during wireless charging is also avoided. The support member 21a and the isolating member 22a cooperate to form a closed ring, so the case 100a is easy to carry. Optionally, the isolating member 22a includes a plastic part. Optionally, the isolating member 22a may also be made of wood or ceramic. An angle between a center line of the isolating gap (the open segment 212a) and a center line of the support member 21a is no more than 5 degrees. An angle between a center line of the isolating gap (the open segment 212a) and a center line of the magnetic alignment member 24a is no more than 5 degrees.

In one embodiment, a surface of the ring segment 211a opposite to the back wall 11a is flush with an outer surface of the back wall 11a and a surface of the isolating member 22a opposite to the back wall 11a, for facilitating the support member 21a and the isolating member 22a contacting with the external wireless charger, and also for aesthetic purposes. Specifically, a side of the ring segment 211a opposite to the back wall 11a has a third surface 2113a, a side of the isolating member 22a opposite to the back wall 11a has a fourth surface 2114a, the third surface 2113a is flush with the fourth surface 2114a, to avoid a bulge formed between the support member 21a and the isolating member 22a, further to avoid an interference to the wireless charger when the support member 21a contacts the wireless charger.

In one embodiment, an inner side of the support member 21a is defined as a first side 2115a, the isolating member 22a has a second side 221a, the first side 2115a and the second side 221a are in the same arc, so as to enhance a sense of touch. A side of the isolating member 22a adjacent to the back wall 11a defines an operation portion 222a which may be a groove, a slot, a through hole, or a protrusion.

In one embodiment, one of the magnetic assembly 20a and the back wall 11a includes at least one locking member 215a, and another one of the magnetic assembly 20a and the back wall 11a defines at least one locking groove 1125a, the at least one locking member 215a is locked in the at least one locking groove 1125a when the magnetic assembly 20a is received in the receiving space 1123a. In detail, the outer edge of the support member 21a is provided with a locking member 215a, when the support member 21a is received in the receiving space 1123a, the locking member 215a is clamped in the locking groove 1125a, to limit the support member 21a in the receiving space 1123a, further to avoid the support member 21a disengaging from the receiving space 1123a when there is no need to rotate the support member 21a. Optionally, the locking member 215a may also be disposed on the outer edge of the isolating member 22a. Optionally, the support member 21a includes a metal portion that may be magnetized, such as iron. In another embodiment, the isolating member 22a defines a locking groove, and a bottom wall of the receiving space 1123a is arranged with a locking member which may be locked in the locking groove.

In one embodiment, the second connecting element 23a is connected with an end of the support member 21a opposite to the open segment 212a. The second connecting element 23a includes a connecting portion 231a, a first connecting tube 232a and a second connecting tube 233a, the first connecting tube 232a and the second connecting tube 233a are spaced from each other and connected to the connecting portion 231a, surfaces of the connecting portion 231a, the first connecting tube 232a, and the second connecting tube 233a opposite to the back wall 11a are flush with the surface of the support member 21a opposite to the back wall 11a. Optionally, when the support member 21a is located in the receiving space 1123a, a surface of the second connecting element 23a opposite to the back wall 11a is flush with the surface of the back wall 11a, and the surface of the support member 21a opposite to the back wall 11a is flush with the surface of the back wall 11a to avoid the presence of protrusion that may affect the connection between the magnetic assembly 20a and the external wireless charger. A mounting portion 214a is received in a receiving groove 213a of the support member 21a, the connecting portion 231a is received in the mounting position 214a, the first connecting tube 232a and the second connecting tube 233a extend out of the support member 21a. Optionally, the connecting portion 231a includes the first connecting tube 232a and the second connecting tube 233a, the first connecting tube 232a and the second connecting tube 233a are integrated on an edge of the support member 21a.

In one embodiment, a side of the ring segment 211a near the back wall 11a defines the receiving groove 213a, and the magnetic alignment member 24a is received in the receiving groove 213a. By providing the magnetic alignment member 24a, the magnetic force of the magnetic assembly 20a is enhanced, so it is convenient to adsorb the case 100a on the wireless charger or adsorb with the mobile phone. Optionally, the magnetic alignment member 24a may be an iron sheet or a magnet ring.

In one embodiment, the magnetic assembly 20a further includes an adhesive layer 25a, the adhesive layer 25a is received in the receiving groove 213a, and connected with the magnetic alignment member 24a. The magnetic alignment member 24a is installed in the receiving groove 213a by the adhesive layer 25a. Optionally, the adhesive layer 25a is formed by curing at least one of the 3M glue or liquid glue.

In one embodiment, the magnetic assembly 20a further includes a decorative layer 26a, the decorative layer 26a is received in the receiving groove 213a, the decorative layer 26a covers the magnetic alignment member 24a to shield the magnetic alignment member 24a and to enhance the appearance of the case 100a. Optionally, the decorative layer 26a may be made of mylar.

In one embodiment, the support member 21a is rotatably connected to the first connecting element 272a through the second connecting element 23a. The first connecting element 272a and the operation portion 113a are located at opposite ends of the receiving space 1123a. The operation portion 113a may be a groove, a through hole, or a protrusion.

In one embodiment, the connecting member further includes a third connecting element 273a, the rotating element 271a is fixed in the first connecting tube 232a and the second connecting tube 233a. The support member 21a is rotatably connected to the back wall 11a by the rotating element 271a. A part of the first connecting element 272a is mounted on the first surface 111a, another part of the first connecting element 272a is passed through the first surface 111a and rotatably connected with the rotating element 271a, the third connecting element 273a is mounted on the second surface 112a, and partially passed through the second surface 112a and the first surface 111a to connect with the first connecting element 272a. The first connecting element 272a and the third connecting element 273a are arranged on two opposite surfaces of the back wall 11a, the risk of a damaging to the back wall 11a due to a pull of the back wall 11a caused by a rotation of the support member 21a is reduced. Optionally, the first connecting element 272a includes a first portion 2721a and a second portion 2722a which can be defines as a third connecting tube, the first portion 2721a is received in the first connecting groove 1112a, the second portion 2722a is connected to the first portion 2721a and received in the second connecting groove 1122a through the second opening 1124a. The second portion 2722a is connected to the rotating element 271a and is provided between the first connecting tube 232a and the second connecting tube 233a. The third connecting element 273a is disposed in a second connecting groove 1122a and passes through the back wall 11a to connect the first portion 2721a. Optionally, the back wall 11a defines at least one first through hole 1113a, the first portion 2721a defines at least one second through hole 2723a, the third connecting element 273a is provided with at least one connecting column 2731a, the connecting column 2731a is passed through the first through hole 1113a, and riveted within the second through hole 2723a. The third connecting element 273a is flush with an outer surface of the back wall 11a.

In one embodiment, the decorative layer 1114a is received in the first connecting groove 1112a, and configured for covering the first connecting element 272a and avoiding the first connecting element 272a from rubbing against the surface of the electronic device.

In one embodiment, the isolating member 22a and the second connecting element 23a are arranged relative to each other, which facilitates the rotation of the support member 21a by the isolating member 22a. The support member 21a may rotate relative to the first connecting element 272a. Optionally, the support member 21a may be rotated at an angle of 90°.

When assembling the case 100a, the magnetic alignment member 24a is installed in the receiving groove 213a through the adhesive layer 25a, and then the decorative layer 26a is also provided in the receiving groove 213a to cover the magnetic alignment member 24a, the isolating member 22a is installed on the support member 21a, the second connecting element 23a is installed in the mounting position 211a, and then the second portion 2722a is disposed between the first connecting tube 232a and the second connecting tube 233a, and the rotating element 271a is passed through the first connecting tube 232a, the second portion 2722a and the second connecting tube 233a in sequence, and fixed to the first connecting tube 232a and the second connecting tube 233a, and then the first portion 2721a is passed through the second opening 1124a, and the support member 21a is placed in the receiving space 1123a, and the first connecting element 272a is fixed in the first connecting groove 1112a by the third connecting element 273a.

When the mobile phone needs to be charged, the support member 21a is provided in the receiving space 1123a, the case 100a is placed on the wireless charger, and docked with the wireless charger through the support member 21a and the magnetic alignment member 24a, so the electronic device is charged. When it is necessary to support the case 100a, the support member 21a is rotated away from the housing 10a to define an angle with the back wall 11a, so the magnetic assembly 20a can support the housing 10 and the mobile phone.

In another embodiment, the magnetic assembly 20a can also be used in a vehicle and cooperate with a vehicle bracket, the magnetic assembly 20a can attach the mobile phone on the vehicle bracket. It should be understood that, the magnetic assembly 20a can also cooperate with other brackets, such as mobile phone bracket, IPAD mobile phone bracket, and so on.

The back wall 11a is rotatably connected with the support member 21a, when it is necessary to support the case 100a, the support member 21a can be rotated to support the housing 10a; when there is no need to support the housing 10a, the support member 21a and the magnetic alignment member 24a are docked with the wireless charger, the support member 21a includes the ring segment 211a and the open segment 212a, so that the support member 21a is in an open ring structure, So that, the influence of the support member 21a on wireless charging is reduced, and the interruptions during wireless charging are avoided.

Referring to FIGS. 10-20, the present disclosure provides a case 100b according to a second embodiment. The case 100b is used to accommodate an electronic device and/or cooperate with an external wireless charger to wirelessly charge the electronic device. Optionally, the electronic device may be mobile phone, pad and other mobile devices. The second embodiment takes the mobile phone as an example.

The case 100b includes a housing 10b, and a magnetic assembly 20b mounted on the housing 10b. The housing 10b may be made of silicone, polycarbonate, thermoplastic polyurethanes, or the like. The housing 10b includes a back wall 11b, and four side walls 12b, the side walls 12b and the back wall 11*b* cooperatively form a receiving cavity 101*b* for receiving the mobile phone. The magnetic assembly 20*b* includes a magnetic alignment member 21*b*, a support member 25*b* connected with the magnetic alignment member 21*b*, and a connecting member 26*b* arranged on a long side wall 12*b* and configured for rotatably connect the support member 25*b* with the housing 10*b*.

A thickness of the magnetic alignment member 21*b* is 0.3-4 mm, and a thickness of the magnetic assembly 20*b* is 1-5 mm. An inner diameter of the magnetic alignment member 21*b* is 40-52 mm, and an inner diameter of the magnetic assembly 20*b* is about 38-50 mm. An outer diameter of the magnetic alignment member 21*b* is 48-60 mm, and an outer diameter of the magnetic assembly 20*b* is about 50-62 mm. The magnetic alignment member 21*b* defines a magnetic coupling area, a vertical distance between a center of the magnetic coupling area and a top edge of the back wall 11*b* is about 77-97 mm, and a horizontal distance between a center of the magnetic coupling area and a side edge of the back wall 11*b* is about 40-52 mm. At least a portion of the support member 25*b* is capable of rotating relative to the case or the electronic device to define an angle with the case or the electronic device, and the angle is 0-135°.

The back wall 11*b* has an inner surface 111*b* and an outer surface 112*b* opposite to the inner surface 111*b*. The magnetic assembly 20*b* is capable of rotating relative to the housing 10*b* to remain in a folded state and at least one unfolded state. In the folded state, the magnetic assembly 20*b* is attached to the outer surface 112*b* of the back wall 11*b*, to avoid an interference of the magnetic assembly 20*b* on an operation of the mobile phone (e.g., the mobile phone is placed flat on the desktop, or the mobile phone is placed in the pocket of the cloth, or the mobile phone is placed on the wireless charger to be charged, etc.).

Figure 12:
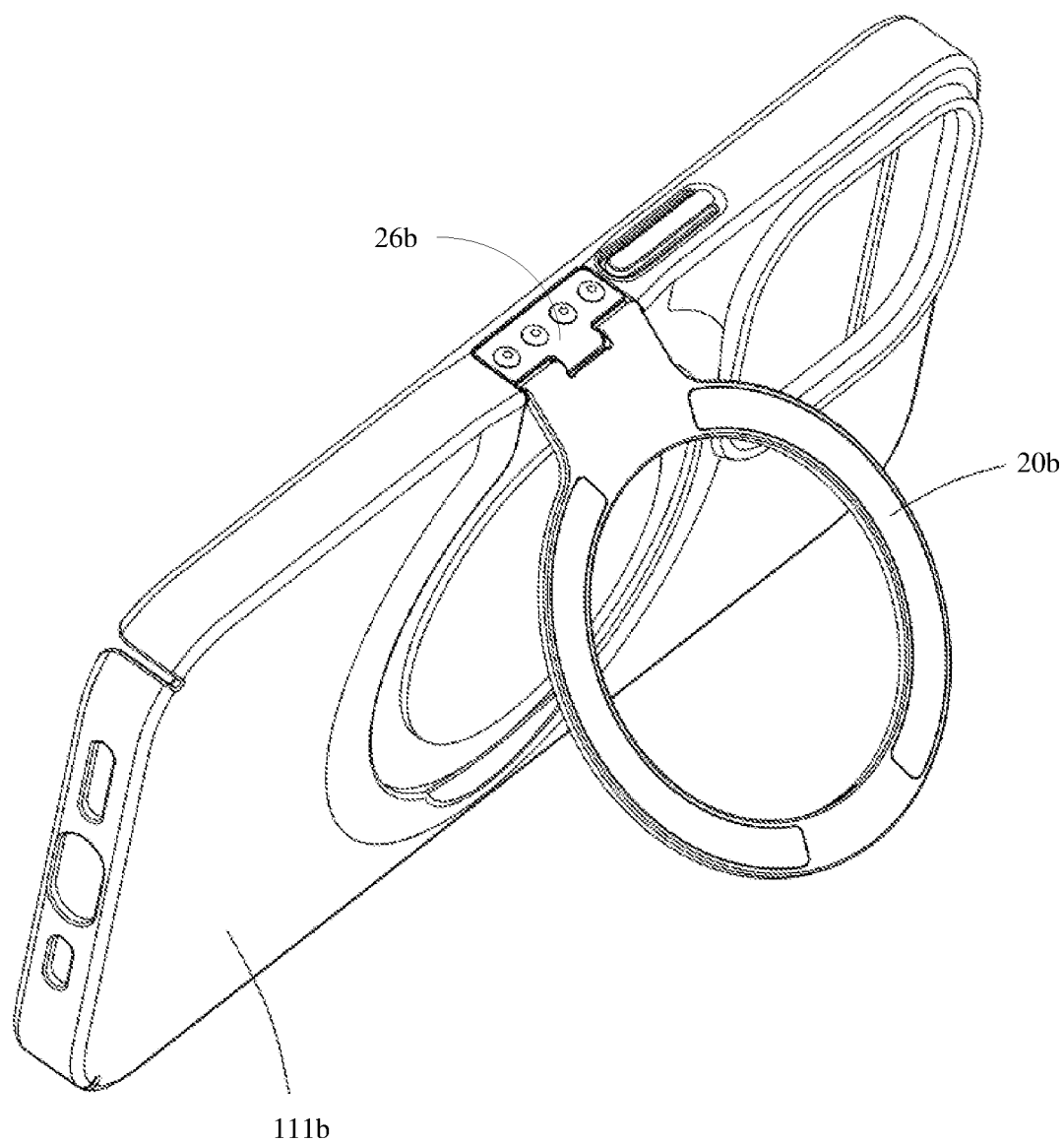
FIG. 12 is a structure diagram of the case of FIG. 10, wherein the magnetic assembly is in an unfolded state and may be used to support an electronic device.

Referring to FIG. 12, in the unfolded state, the magnetic assembly 20*b* supports the mobile phone. At this time, an angle is defined between the magnetic assembly 20*b* and the back wall 11*b*, so that the mobile phone can be slantly placed on a flat surface.

Figure 13:
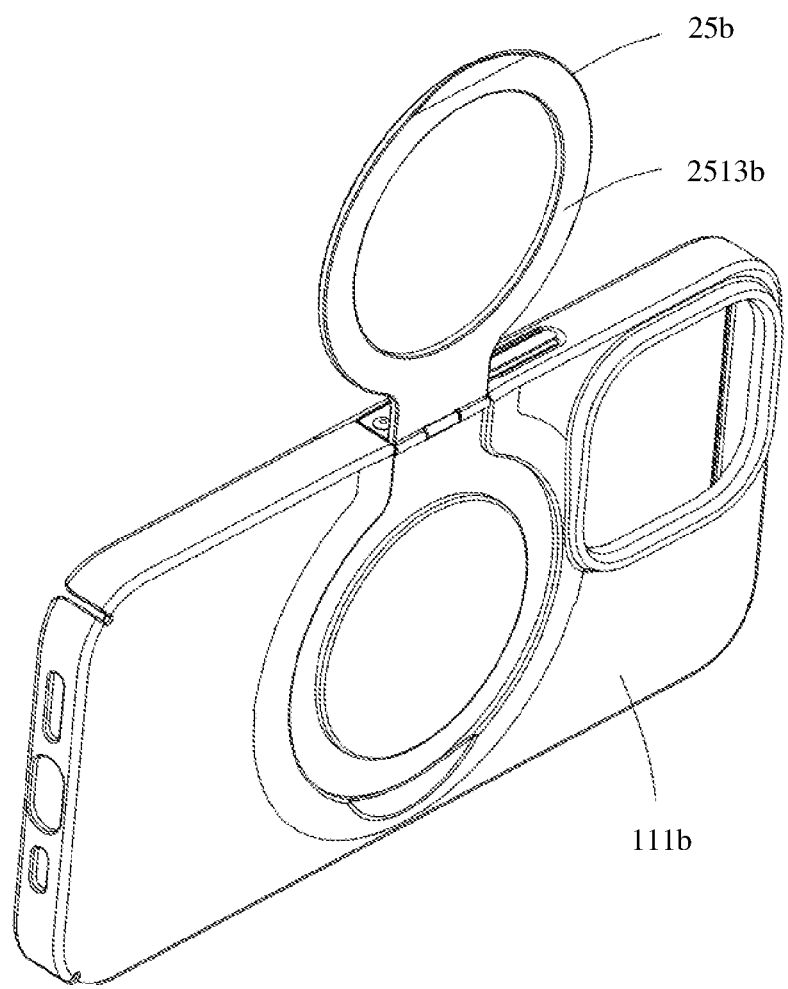
FIG. 13 is a structure diagram of the case of FIG. 10, wherein a magnetic assembly is in another unfolded state may be used as a handle.
Figure 14:
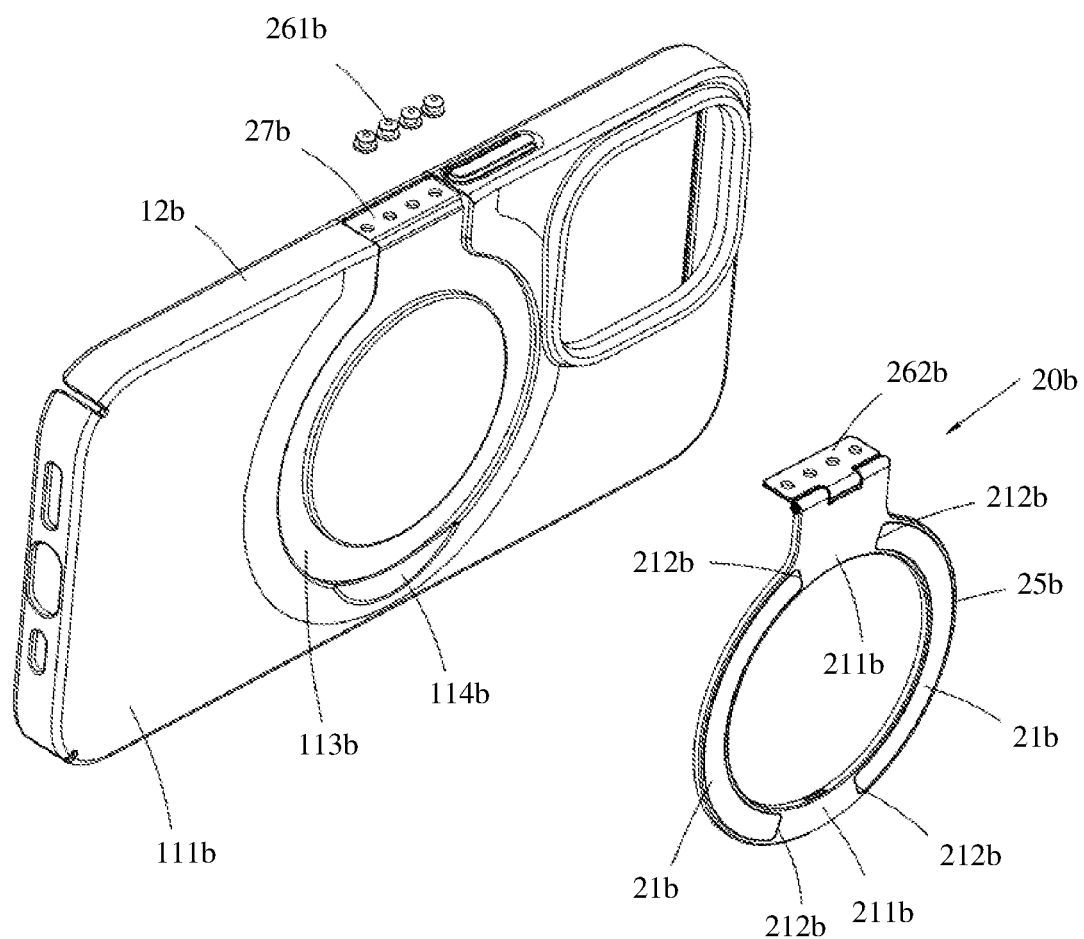
FIG. 14 is an exploded diagram of the case of FIG. 10.

Referring to FIG. 13, in another unfolded state, the magnetic assembly 20*b* is used as a pull ring. At this time, the magnetic assembly 20*b* rotates 180 degrees to be coplanar or parallel to the back wall 11*b*.

It should be understood that the magnetic assembly 20*b* may also have other unfolded states, forming different angles with the back wall 11*b*.

Figure 15:
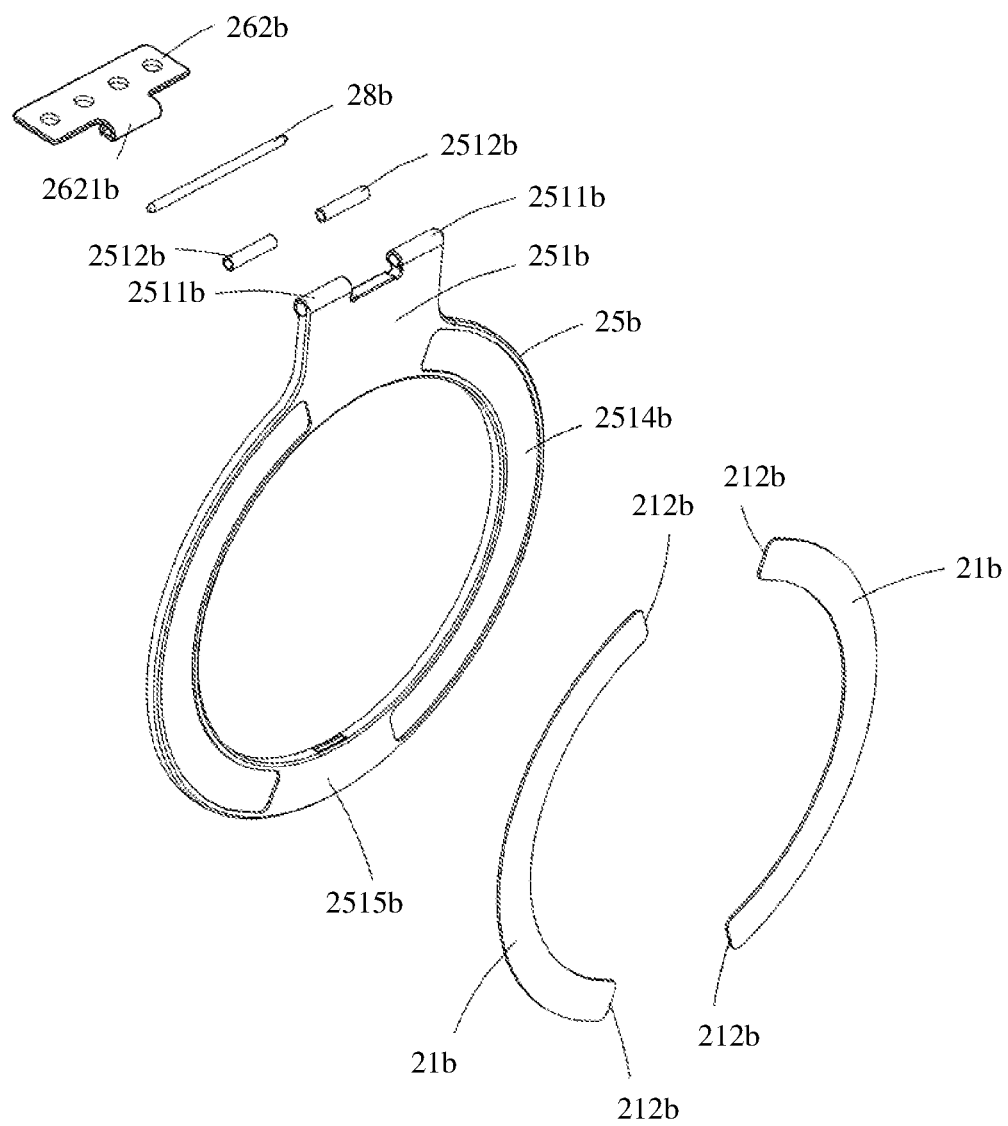
FIG. 15 is an exploded diagram of the magnetic assembly of FIG. 10.
Figure 16:
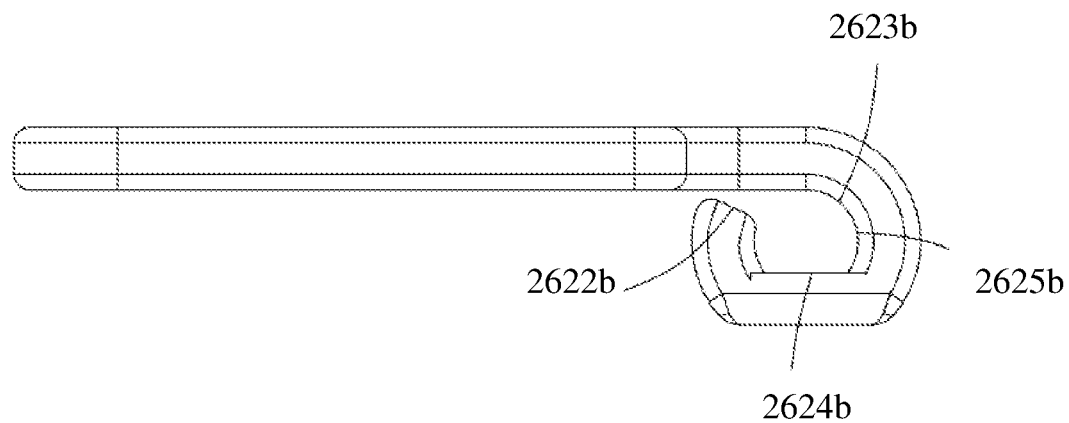
FIG. 16 is a structure diagram of a second connecting portion of the case of FIG. 10.
Figure 17:
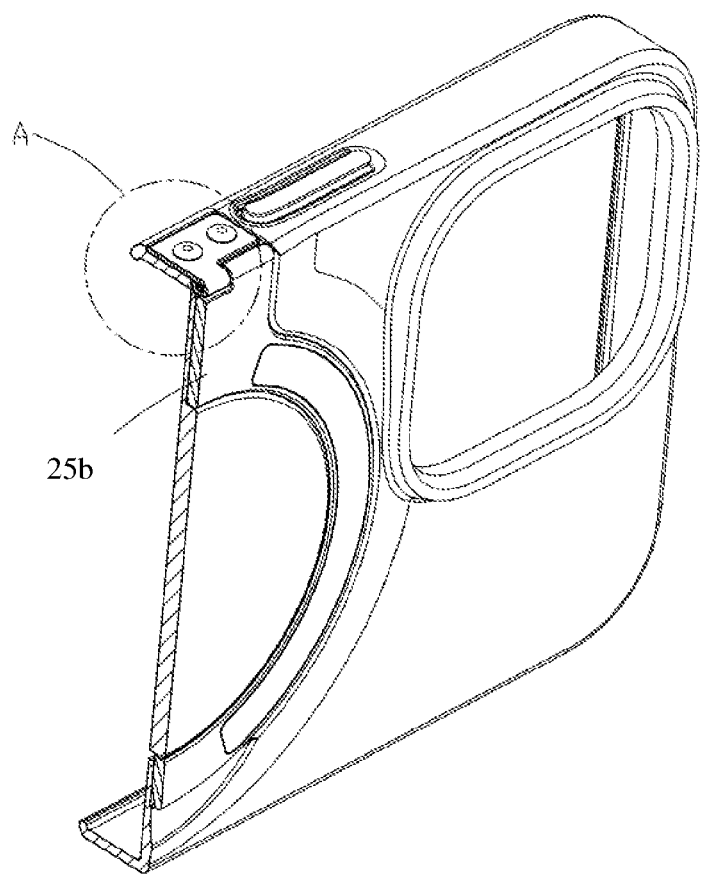
FIG. 17 is a cross sectional diagram of the case, and a pivot part of the second connecting portion is connected with a rotating element.
Figure 18:
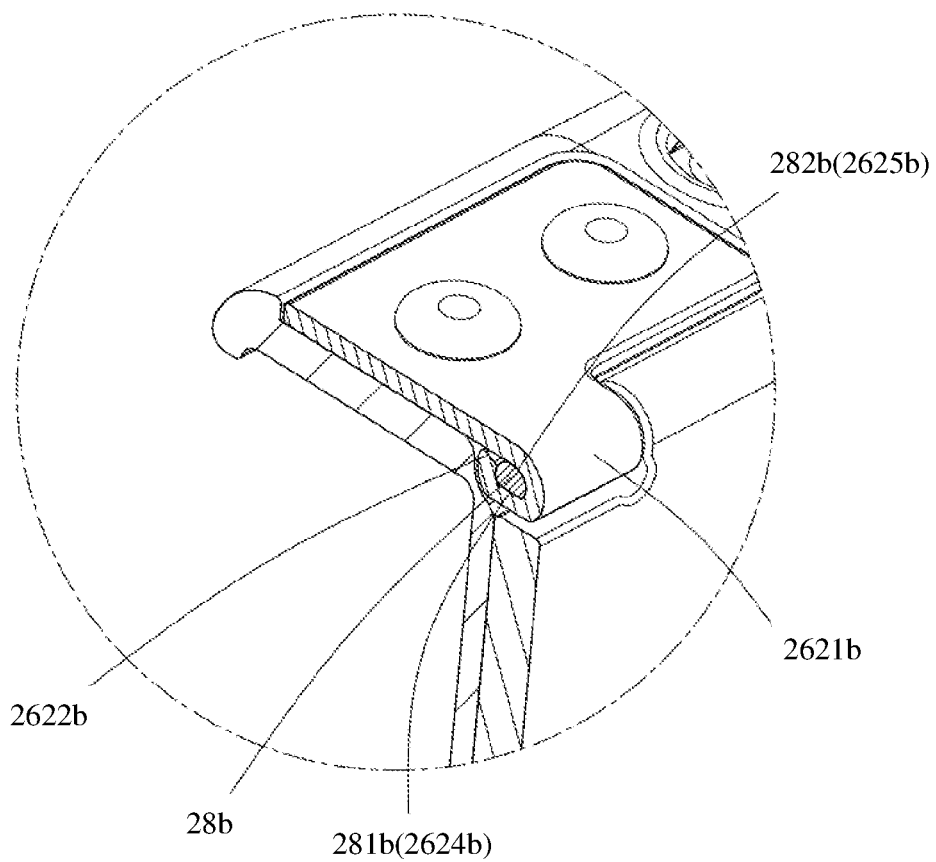
FIG. 18 is an enlarged diagram of portion A in FIG. 17.
Figure 19:
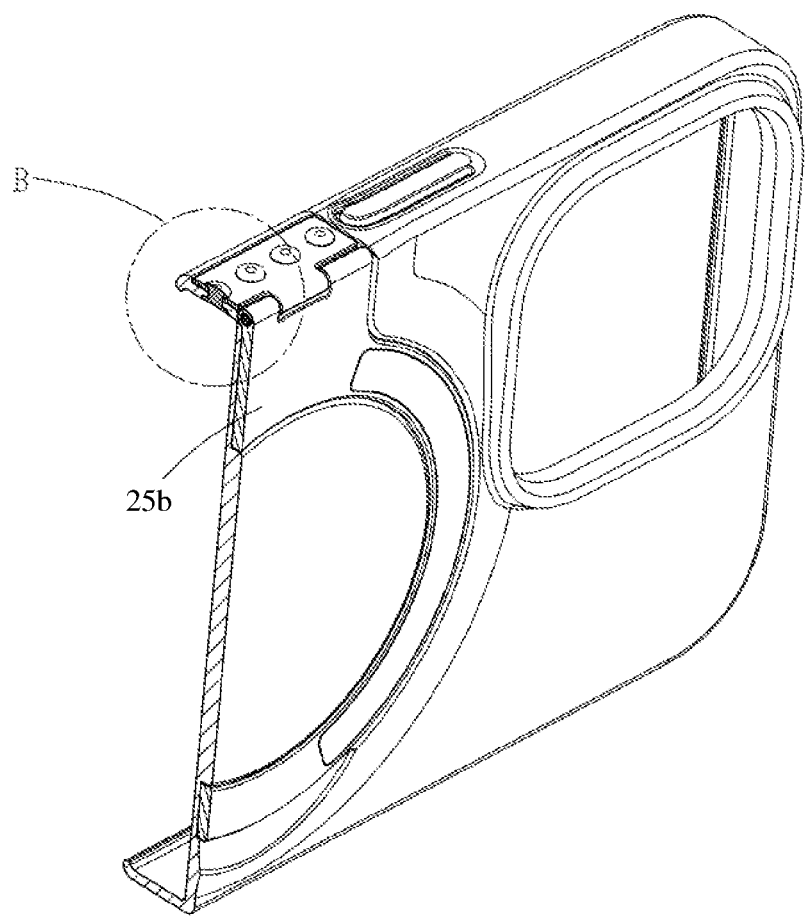
FIG. 19 is another cross sectional diagram of the case, and a first connecting member is connected with the rotating element.
Figure 20:
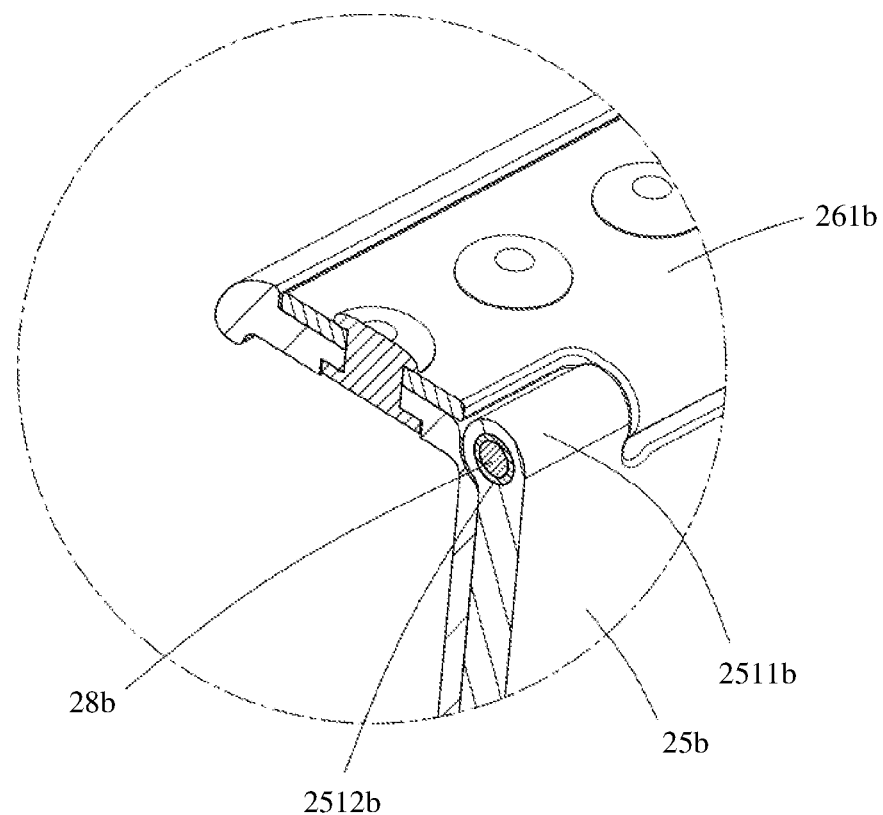
FIG. 20 is an enlarged diagram of portion B in FIG. 19.
Figure 21:
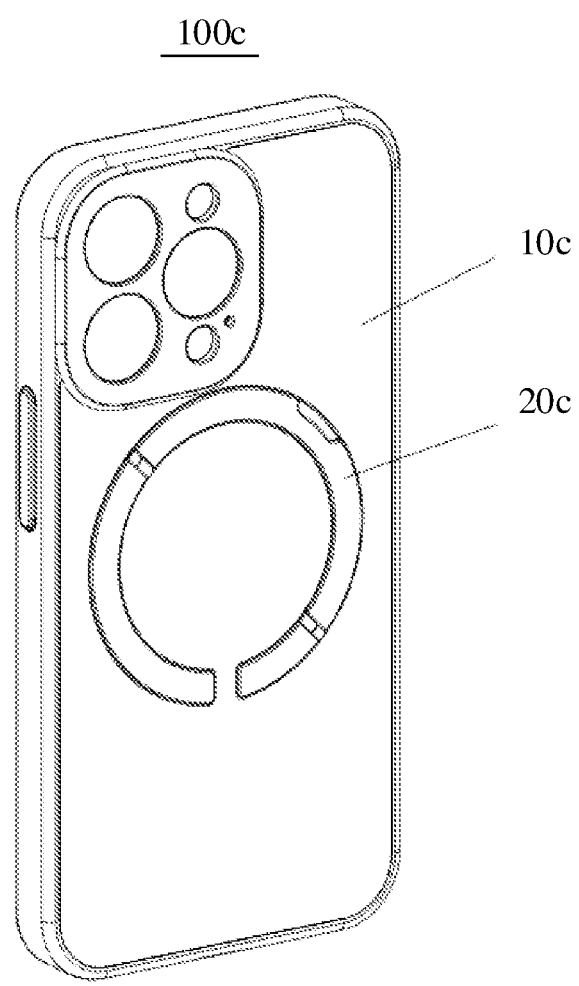
FIG. 21 is a structure diagram of a case according to a third embodiment of the present disclosure.
Figure 22:
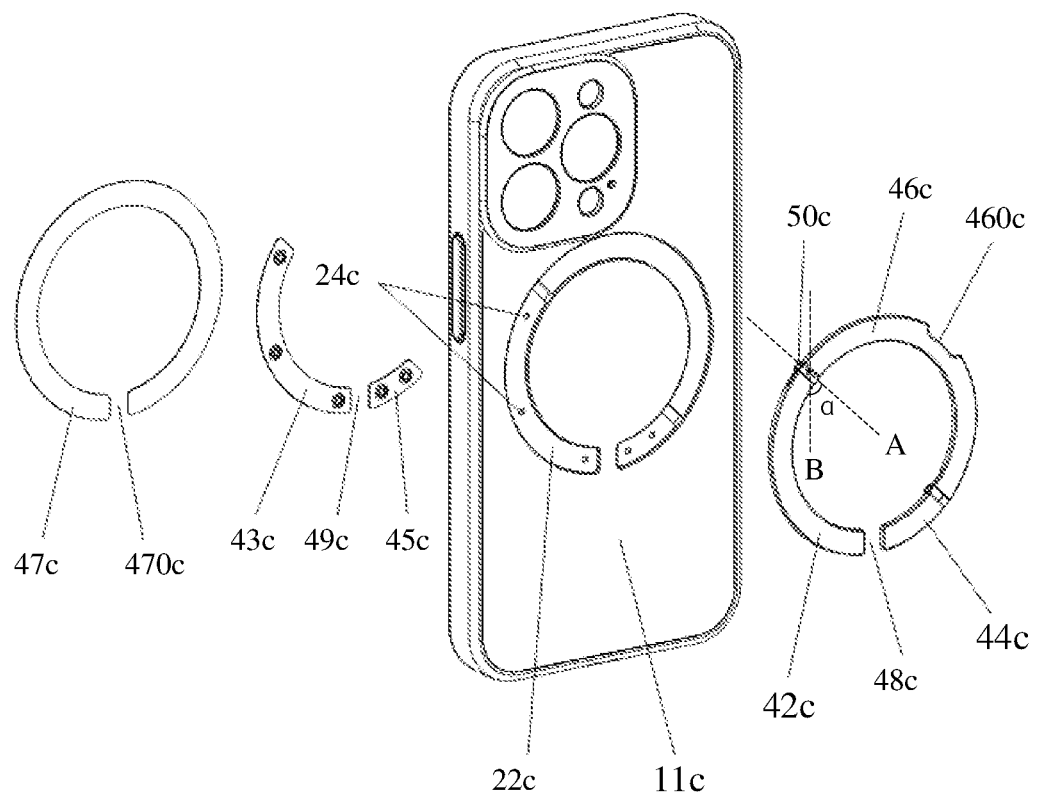
FIG. 22 is an exploded diagram of the case of FIG. 21.
Figure 23:
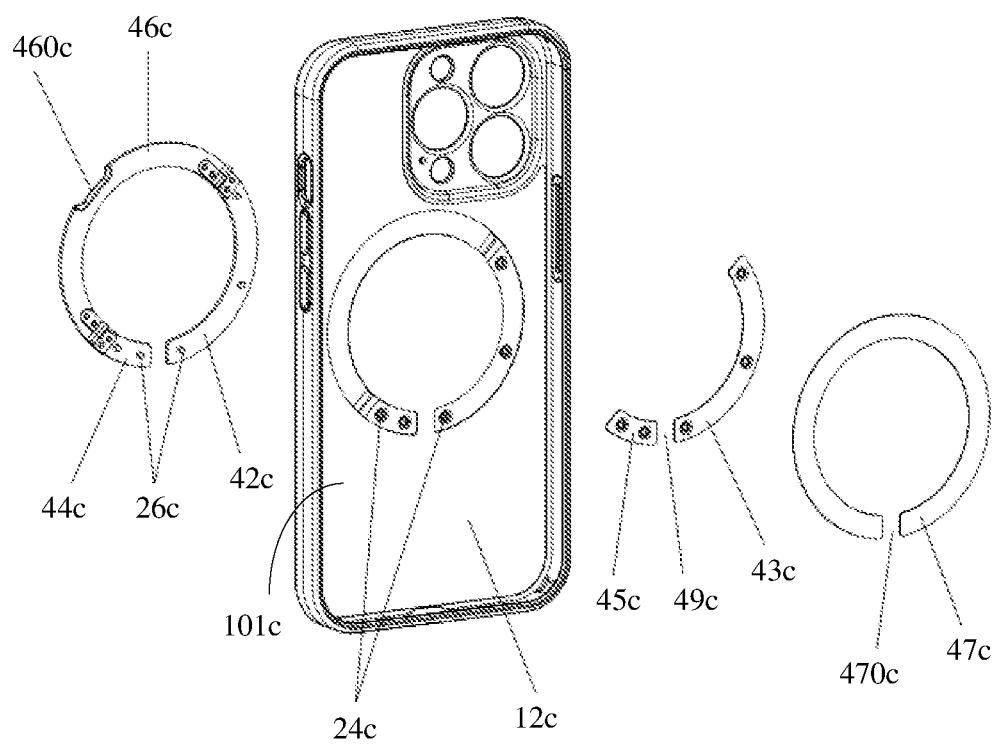
FIG. 23 is another structure diagram of the case of FIG. 21.
Figure 24:
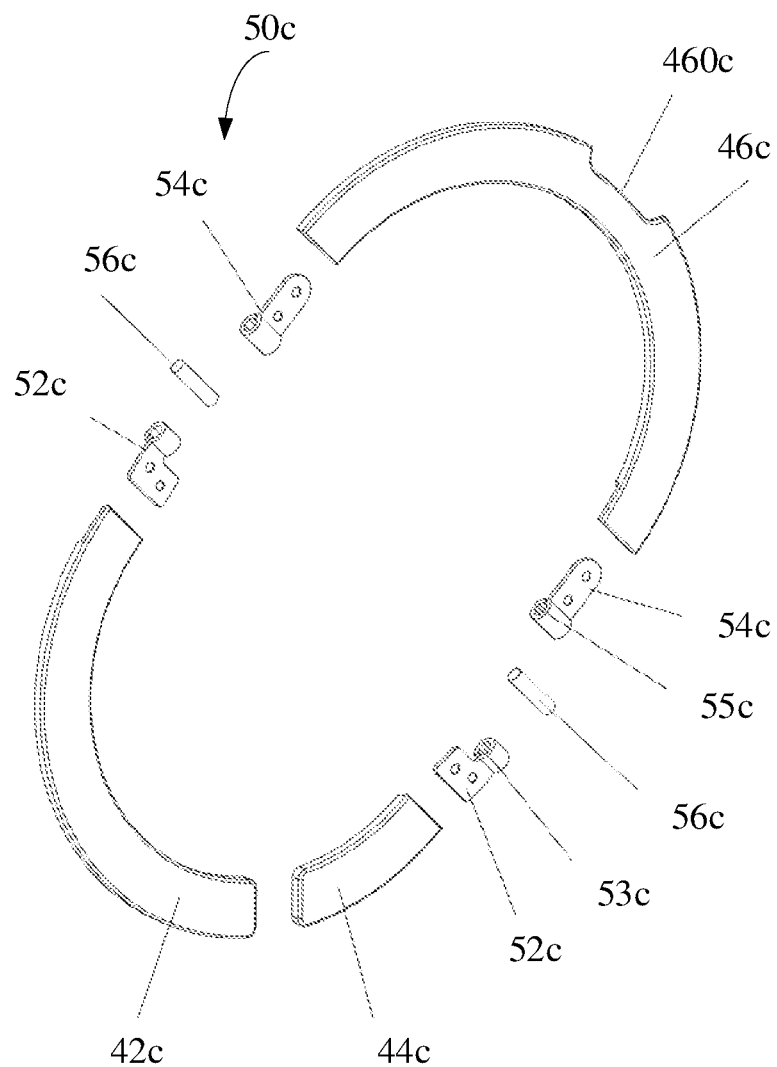
FIG. 24 is a structure diagram of a magnetic assembly diagram of the case of FIG. 21.
Figure 25:
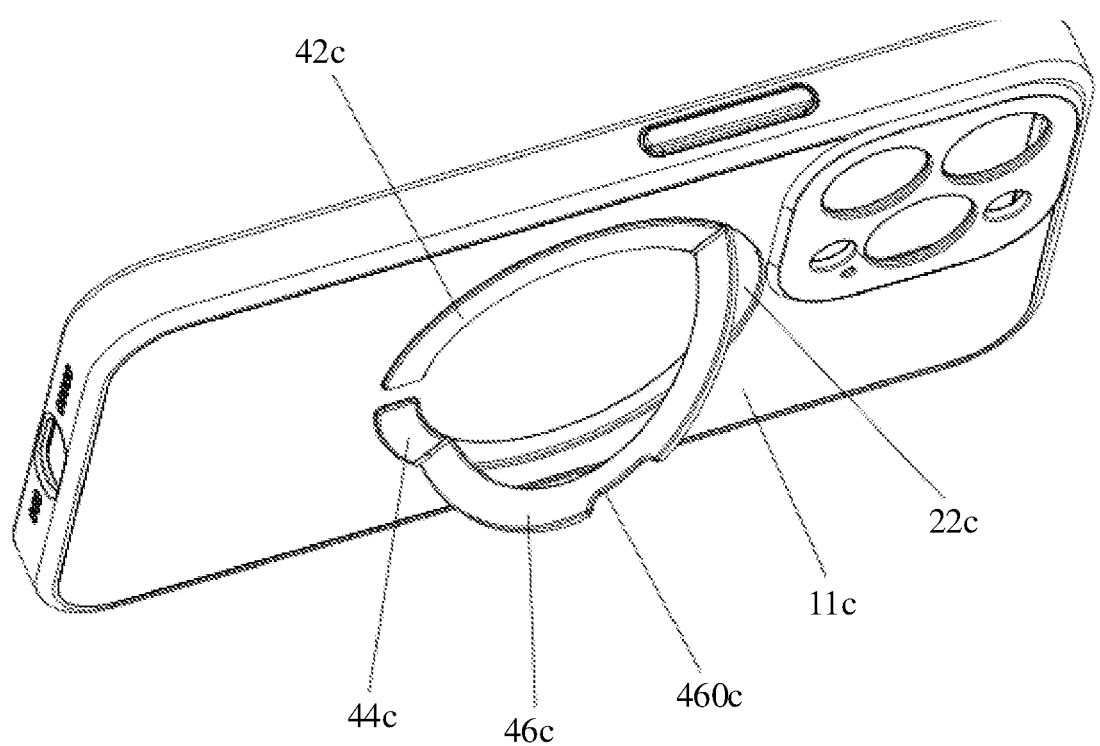
FIG. 25 is a structure diagram of the case in an unfolded state.
Figure 26:
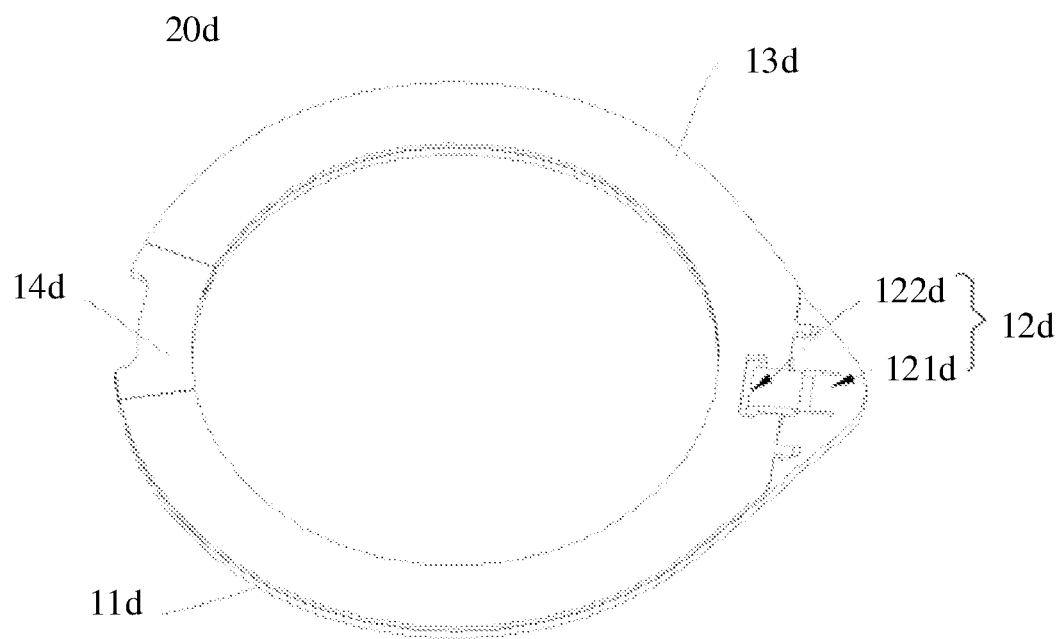
FIG. 26 is a structure diagram of a magnetic alignment member of a case according to a fourth embodiment of the present disclosure.
Figure 27:
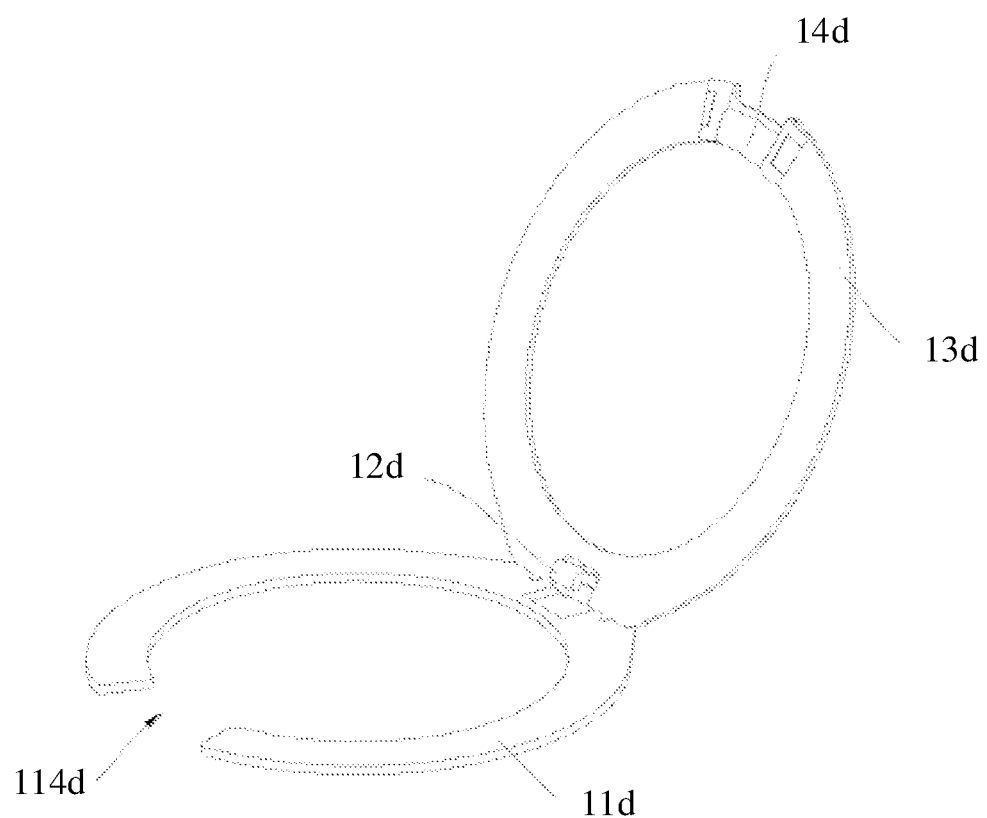
FIG. 27 is a structure diagram of the magnetic alignment member of FIG. 26 in an unfolded state.
Figure 28:
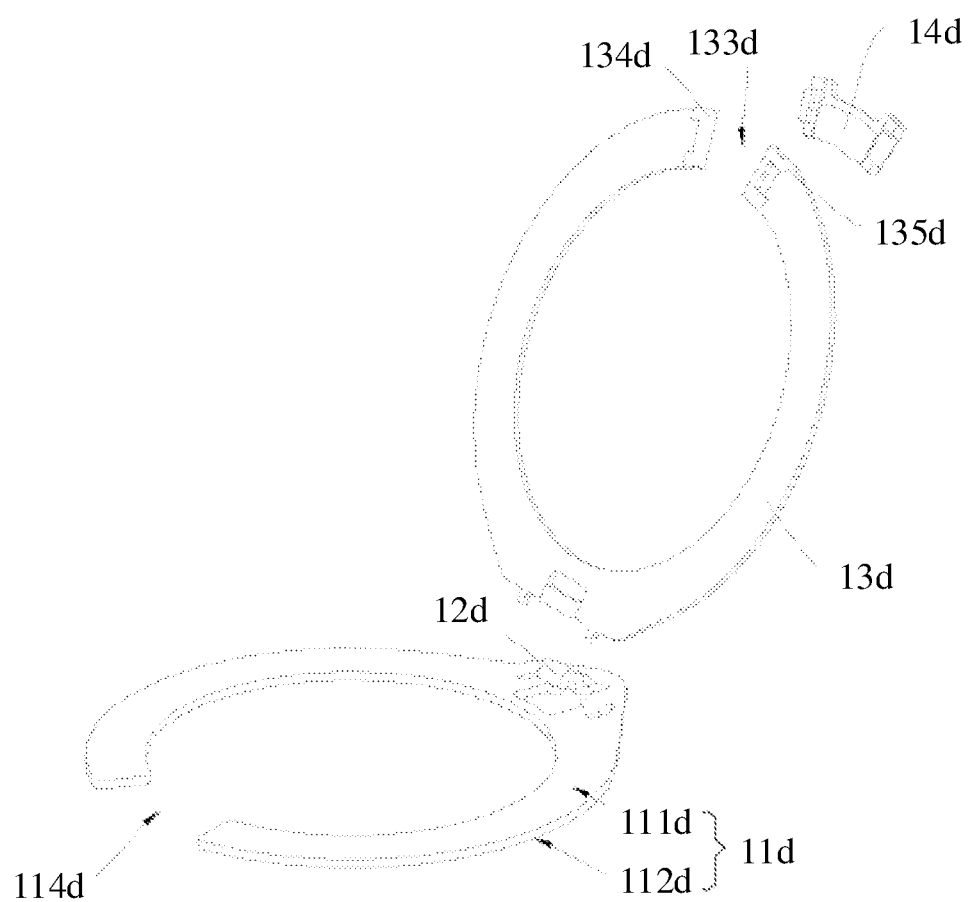
FIG. 28 is an exploded diagram of the magnetic alignment member of FIG. 27.
Figure 29:
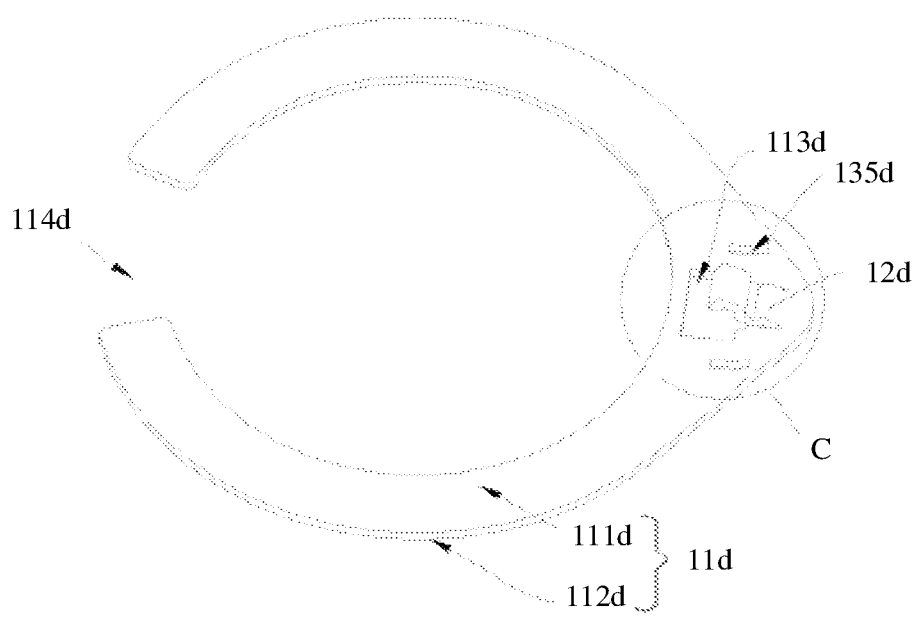
FIG. 29 is a structure diagram of a first connecting member of FIG. 27.
Figure 30:
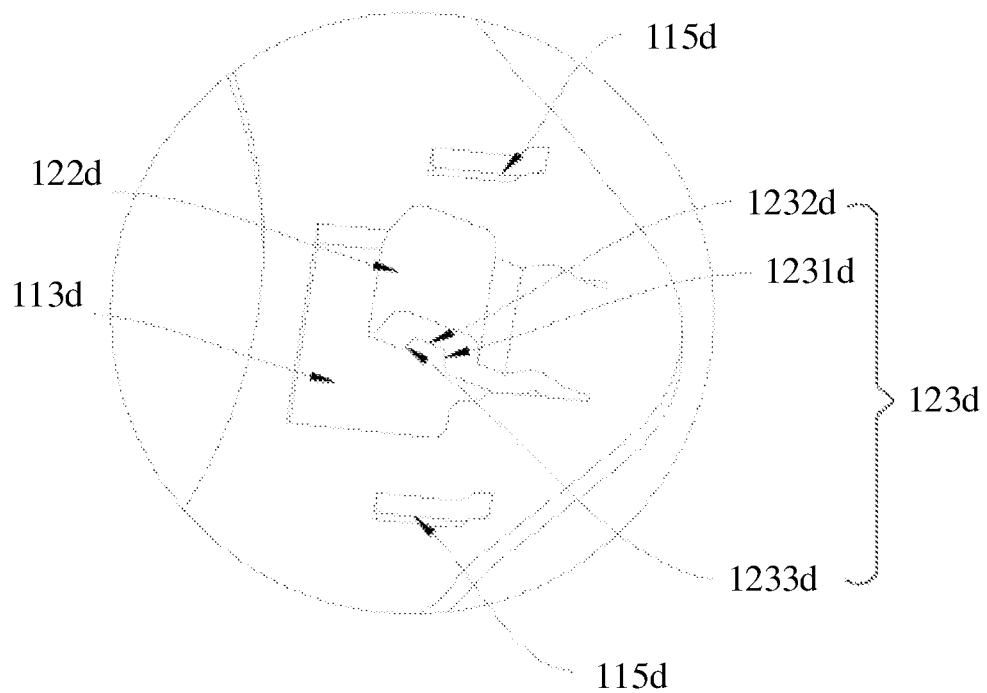
FIG. 30 is an enlarged diagram of portion C in FIG. 29.
Figure 31:
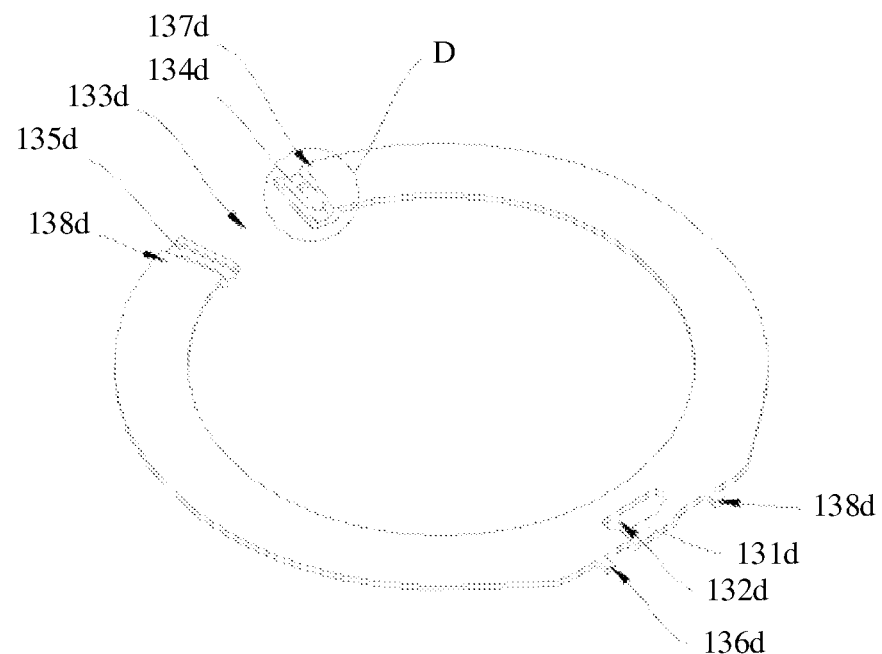
FIG. 31 is another structure diagram of the first connecting member of FIG. 27.
Figure 32:
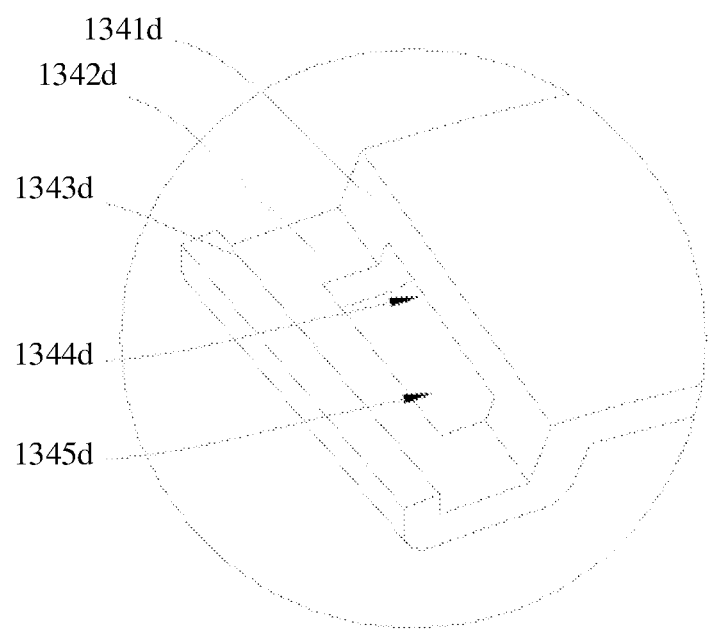
FIG. 32 is an enlarged diagram of portion D in FIG. 31.
Figure 33:
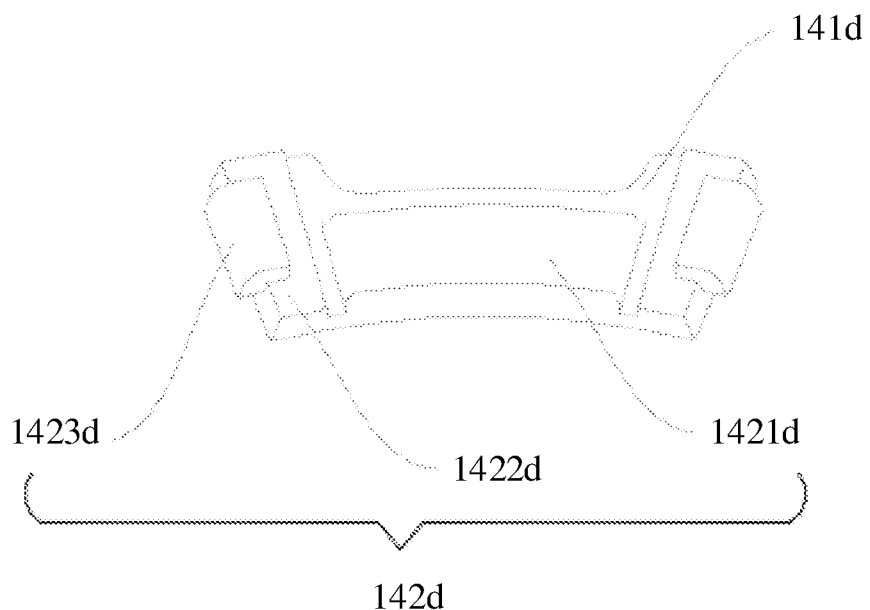
FIG. 33 is a structure diagram of an isolating member of FIG. 27.
Figure 34:
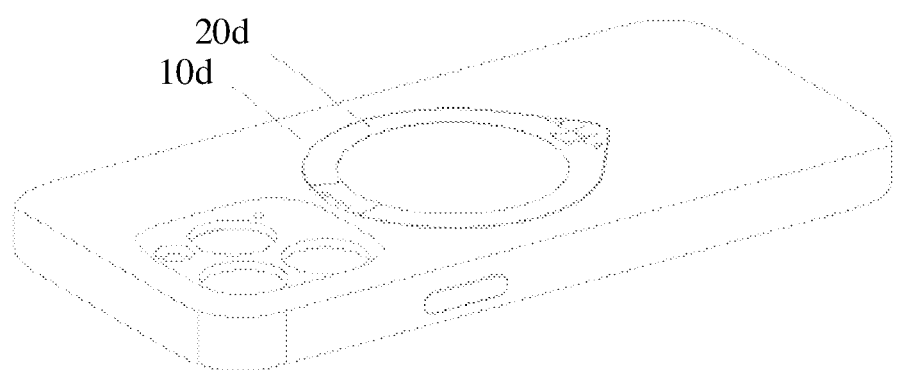
FIG. 34 is a structure diagram of the case according to the fourth embodiment of the present disclosure.
Figure 35:
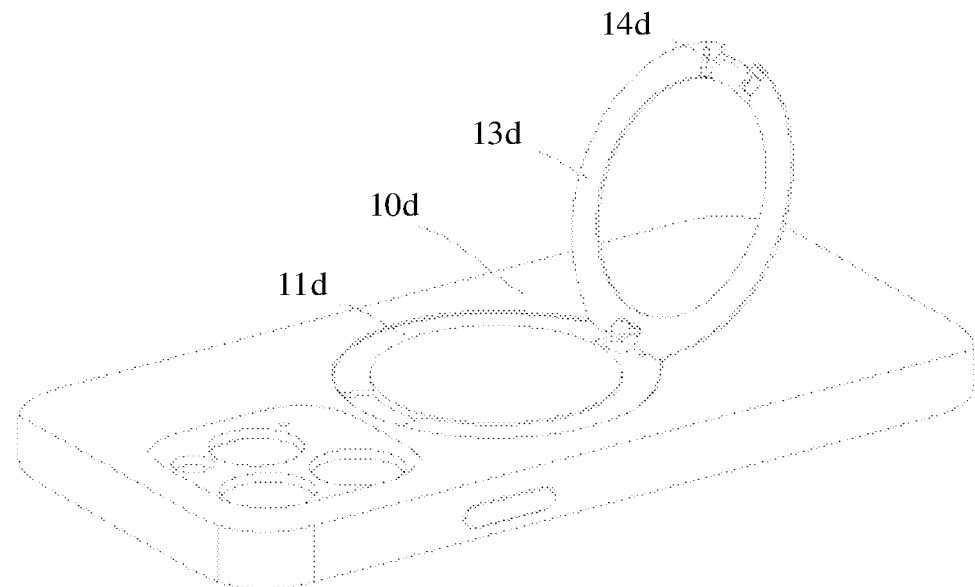
FIG. 35 is a structure diagram of the case of FIG. 34, the case is in an unfolded state.
Figure 36:
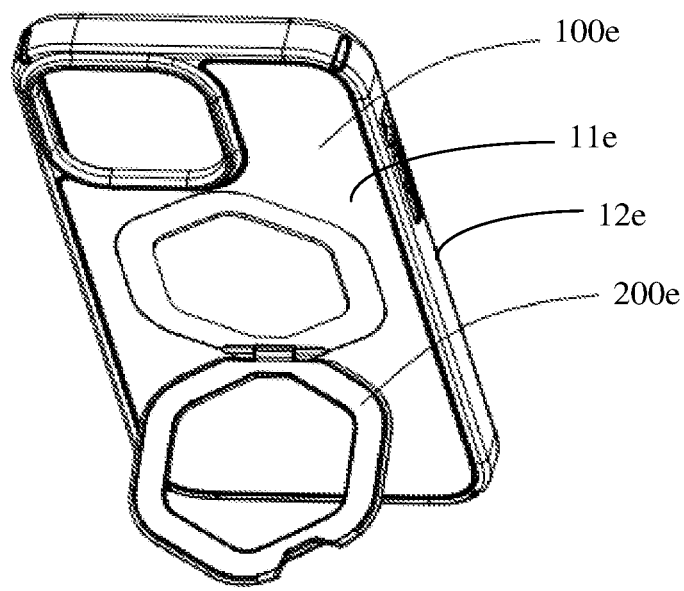
FIG. 36 is a structure diagram of a case according to a fifth embodiment of the present disclosure, a magnetic assembly is in an unfolded state.
Figure 37:
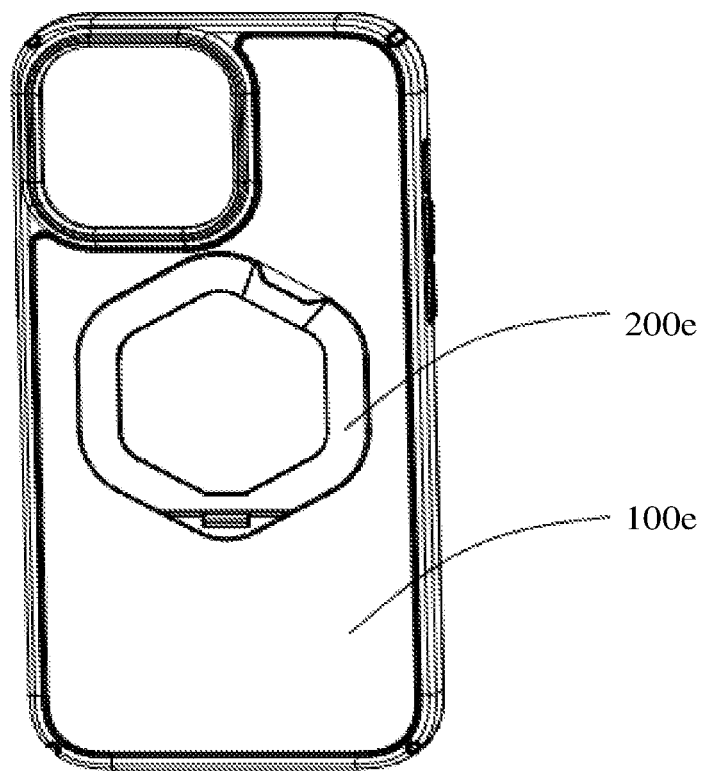
FIG. 37 is a structure diagram of the case of FIG. 36, the magnetic assembly is in a folded state.
Figure 38:
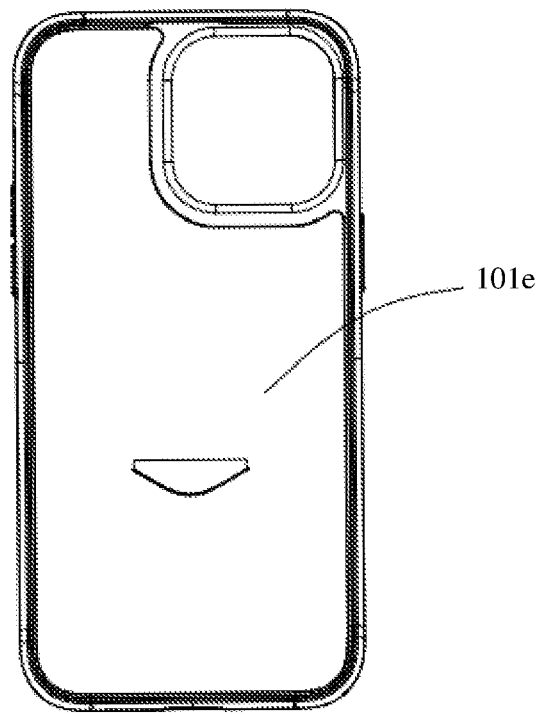
FIG. 38 is another structure diagram of the case of FIG. 37.
Figure 39:
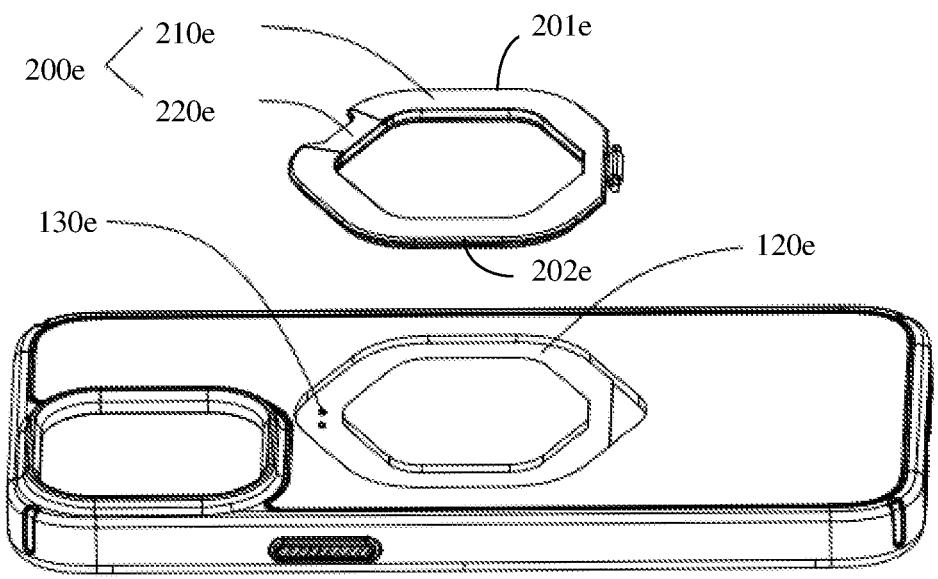
FIG. 39 is an exploded diagram of the case of FIG. 36.
Figure 40:
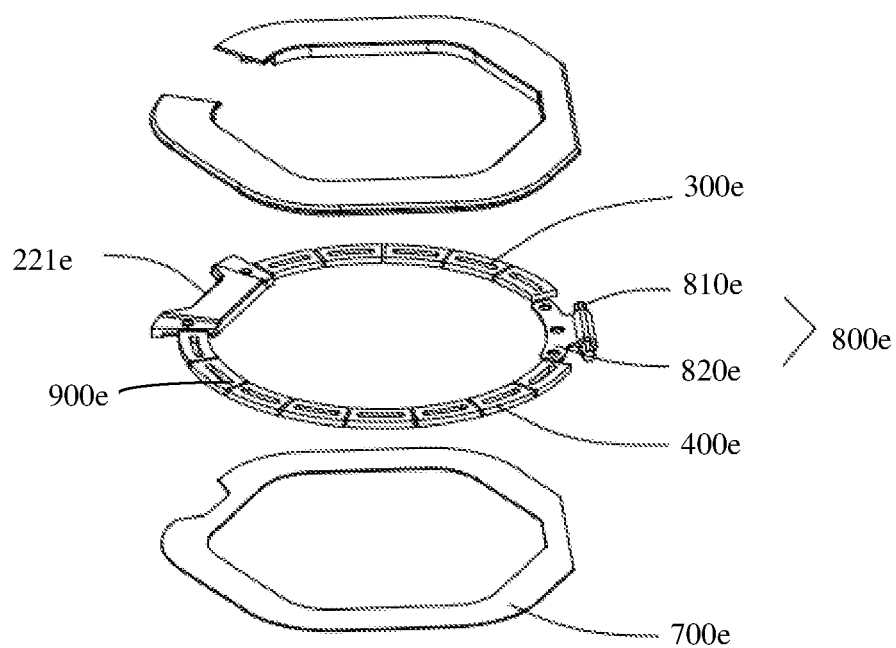
FIG. 40 is an exploded diagram of the magnetic assembly of FIG. 39.
Figure 41:
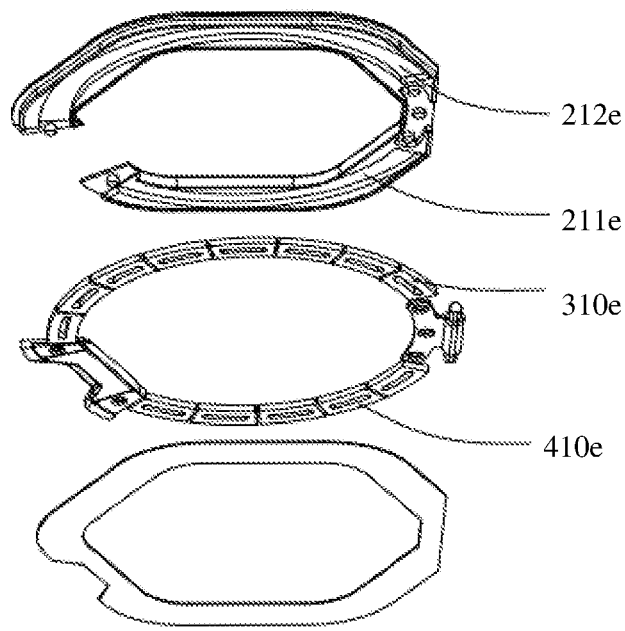
FIG. 41 is another exploded diagram of the magnetic assembly of FIG. 39.

As shown in FIG. 15, the magnetic assembly 20*b* is mounted on one side wall 12*b* of the housing 10*b*. The connecting member 26*b* includes at least one first connecting portion 261*b* mounted on the long side wall 12*b*, the long side wall 12*b* defines a recessed mounting portion 27*b* for receiving the support member 25*b*. The first connecting portion 261*b* may be a rivet.

In the embodiment, the support member 25*b* includes a rotating element 28*b* which may be a hinge, the connecting member 26*b* further includes a second connecting portion 262*b*, the rotating element 28*b* is rotatably connected to the second connecting portion 262*b*. The second connecting portion 262*b* is fixed to the mounting portion 27*b* by at least one first connecting portion 261*b*, thereby mounting the magnetic assembly 20*b* to the housing 10*b*. The mounting portion 27*b* may be a receiving groove or a through hole. The thickness of the second connecting portion 262*b* corresponds to the recessed depth of the mounting portion 27*b*. The support member 25*b* can be rotated relative to the back wall 11*b* or the side wall 12*b* by the second connecting portion 262*b* and the rotating element 28*b*, so that the magnetic assembly 20*b* can also rotate relative to the housing 10*b* to remain in the aforementioned folded state or at least one unfolded state. In different states, the support member 25*b* may support the mobile phone or act as the pull ring. The second connecting portion 262*b* is generally made of metal with high strength.

The second connecting portion 262*b* has a pivot part 2621*b* sleeved on the rotating element 28*b*, specifically the pivot part 2621*b* is sleeved on a middle section of the rotating element 28*b*. In the embodiment, the pivot part 2621*b* is formed by winding a side edge of the second connecting portion 262*b* into a tubular shape. After winding into the tubular pivot part 2621*b*, a gap is defined between a rear end 2622*b* of the second connecting portion 262*b* and the second connecting portion 262*b*, or a gap is defined between a rear end 2622*b* of the second connecting portion 262*b* and an inner surface 2623*b* of the pivot part 2621*b*. In other embodiment, the rear end 2622*b* may be in contact with the second connecting portion 262*b*. In a further embodiment, the rear end 2622*b* may be in contact with the inner surface 2623*b* of the pivot part 2621*b*.

The inner surface 2623*b* of the pivot part 2621*b* has a first flat surface 2624*b* and a first curved surface 2625*b*. A peripheral surface of a portion of the rotating element 28*b* located within the pivot part 2621*b* has a second flat surface 281*b* and a second curved surface 282*b* connected to the second flat surface 281*b*. When the magnetic assembly 20*b* is in the folded state, the second flat surface 281*b* of the rotating element 28*b* is attached to the first flat surface 2624*b* of the pivot part 2621*b*, and the second curved surface 282*b* of the rotating element 28*b* is attached to the first curved surface 2625*b* of the pivot part 2621*b*. When the magnetic assembly 20*b* is in the folded state, the rotating element 28*b* and the pivot part 2621*b* are relatively fixed to hold the magnetic assembly 20*b* in the folded state. When user manually pulls the support member 25*b* to rotate away from the back wall 11*b* (i.e., when the magnetic member 20*b* is rotated to the unfolded state), the portion of the rotating element 28*b* in the pivot part 2621*b* squeezes the inner surface 2623*b* of the pivot part 2621*b*, when the rotating element 28*b* rotates, the rotating element 28*b* squeezes the rear end 2622*b* of the support member 25*b*, and enlarges an inner space of the pivot part 2621*b* to allow a rotation between the pivot part 2621*b* and the rotating element 28*b*. When user pulls the support member 25*b* towards the back wall 11*b*, user only needs to pulls the support member 25*b* at an initial stage of the rotation, then the rear end 262*b* of the second connecting portion 262*b* elastically squeezes the rotating element 28*b*, so that the support member 25*b* automatically returns to the folded state and remains in the folded state.

The support member 25*b* includes a third connecting portion 251*b* near the second connecting portion 262*b*, and the third connecting portion 251*b* is fixedly connected to the rotating element 28*b*, so that no relative rotation occurs between the third connecting portion 251*b* and the rotating element 28*b*. In the embodiment, the third connecting portion 251*b* includes at least one connecting pipe 2511*b*, the connecting pipe 2511*b* is sleeved on the rotating element 28*b*. A damping material is provided between the connecting pipe 2511*b* and the rotating element 28*b*, to increase the friction between the connecting pipe 2511*b* and the rotating element 28*b*, so that the connecting pipe 2511*b* and the rotating element 28*b* are relatively fixed and cannot rotate relative to each other, and the support member 25*b* can not rotate relative to the rotating element 28*b*. In the embodiment, the third connecting portion 251*b* includes two connecting pipes 2511b, which are respectively located on both sides of the second connecting portion 262b and respectively sleeved on both ends of the rotating element 28b. The damping material may include two damping tubes 2512b, which are sandwiched between the connecting pipes 2511b and the rotating element 28b.

The support member 25b has an annular inner surface 2513b and an annular outer surface 2515b. In the folded state, the annular inner surface 2513b of the support member 25b is attached to the outer surface 111b of the back wall 11b. The outer surface 111b of the back wall 11b defines a receiving space 113b matching the shape of the support member 25b. In the folded state, the support member 25b is received in the receiving space 113b, and the annular outer surface 2515b of the support member 25b is flush with the outer surface 111b of the back wall 11b. The outer surface 111b of the back wall 11b further defines an operation portion 114b which is a groove or a through hole, and used as a buckle position, the operation portion 114b is defined in a position outside the receiving space 113b. The operation portion 114b is communicated to the receiving space 113b, so user may pull the support member 25b from the folded state. In the embodiment, the operation portion 114b is defined outside a periphery of the receiving space 113b away from the mounting portion 27b.

The support member 25b is made of non-magnetic conduction material, such as alloy materials, the alloy material may be aluminum alloy, zinc alloy, etc. The outer surface 2515b is provided with at least one magnetic alignment member 21b. The magnetic alignment member 21b is distributed along a circumference of the outer surface 2515b and forms an isolating gap 211b in the circumferential direction, the isolating gap 211b is also defined in a radial direction of the back wall 11b. In the embodiment, two magnetic alignment members 21b are provided. Each magnetic alignment member 21b is a curved bar. More specifically, the magnetic alignment member 21b may be an iron piece or a magnet piece. In the circumferential direction, there are two opposite circumferential ends 212b. The adjacent circumferential ends 212b of the two magnetic alignment members 21b are spaced apart from each other, forming two isolating gaps 211b. An angle between a center line of the isolating gap 211b and a center line of the magnetic alignment member 21b is no more than 5 degrees.

The magnetic alignment member 21b is provided on the outer surface 2515b, in order to magnetically fix the mobile phone in the housing 10b on other object. In one application scenarios, the mobile phone is fixed to the wireless charger and wirelessly charged by the wireless charger. In general, the wireless charger has a transmitting coil and a magnet located on a periphery of the transmitting coil, the mobile phone is internally provided with a receiving coil for wireless charging. The magnetic alignment member 21b is arranged on the support member 25b, so that when the support member 25b and the magnetic alignment member 21b are in the folded state, the magnetic alignment member 21b is located on a periphery of the receiving coil of the mobile phone in the radial direction. When charging, the receiving coil of the mobile phone is directly aligned with the transmitting coil of the wireless charger, and the magnetic alignment member 21b is directly aligned with the magnet of the wireless charger, and the mobile phone may be magnetically absorbed and positioned on the wireless charger. By setting the isolating gap 211b, the disturbance during charging can be effectively reduced, the heat generated during charging can also be effectively dissipated, thereby avoiding or reducing the influence of the magnetic alignment member 21b on wireless charging.

In the embodiment, the annular outer surface 2515b defines a receiving portion 2514b, and the magnetic alignment member 21b is arranged in the receiving portion 2514b. The outer surface of the magnetic alignment member 21b is flush with or lower than the annular outer surface 2515b. The magnetic alignment member 21b is adhered to, for example, fixed in the receiving portion 2514b. The magnetic alignment member 21b is arranged in the receiving portion 2514b, and the outer surface of the magnetic alignment member 21b does not exceed the annular outer surface 2515b, so that the distance between the receiving coil of the mobile phone and the transmitting coil of the wireless charger may not be increased when the magnetic alignment member 21b is mounted in the receiving portion 2514b, thus avoiding the decreasing of the charging efficiency due to the protrusion between the magnetic alignment member 21b and the annular outer surface 2515b.

Although the second embodiment of the present disclosure shows two magnetic alignment members 21b, but in other embodiments there may be provided with one strip-shaped magnetic alignment member on the annular outer surface 2514b, the strip-shaped magnetic alignment member defines an isolating gap. In some other embodiments, there are at least two sub magnetic alignment elements, and the isolating gap is defined between two adjacent sub magnetic alignment elements in the radial direction.

In the above embodiments, the magnetic alignment member 21b is disposed on the annular outer surface 2514b of the support member 25b. In other embodiments, the magnetic alignment member 21b may also be disposed on the annular inner surface 2513b of the support member 25b. The distance between the magnetic alignment member 21b located on the annular inner surface 2513b and the magnet of the wireless charger may be greater than the distance between the magnetic alignment member 21b located on the annular outer surface 2515b and the magnet of the wireless charger. So that, from the magnetic adsorption perspective, the scheme of the magnetic alignment member 21b locating on the annular outer surface 2514b may be better than the scheme of the magnetic alignment member 21b locating on the annular inner surface 2513b. Further, the magnetic alignment member 21b is exposed from the annular outer surface 2514b, so that the magnetic alignment member 21b can be combined with the support member 25b to increase the sense of depth and achieve a better aesthetics.

Referring to FIGS. 21-25, the present disclosure provides a case 100c according to a third embodiment. The case 100c includes a housing 10c and a magnetic assembly 20c rotatably connected to the housing 10c, the housing 10c includes a back wall 11 and a side wall 12c, the back wall 11c and the side wall 12c cooperatively define a receiving cavity 101c for receiving electronic device, the magnetic assembly 20c is disposed on the outer side of the back wall 11. The third embodiment takes the mobile phone as an example. The magnetic assembly 20c includes a folded state and an unfolded state, in the folded state the mobile phone can be placed flat, in the unfolded state the mobile phone can be placed at a certain angle. User can switch the magnetic assembly 20c between the folded state and the unfolded state according to actual needs. In the folded state, the electronic device can be charged. In the unfolded state, the electronic device is supported for use.

The magnetic assembly 20c has an annular structure, and includes a support member 46c, and a magnetic alignment member, and a connecting member, the connecting member, the magnetic alignment member includes a first sub magnetic alignment element 42c and a second sub magnetic alignment element 44c both fixedly connected to the back wall 11c, the connecting member includes a first connector 43c riveted with the first sub magnetic alignment element 42c by the rivets 26c, and a second connector 45c riveted with the second sub magnetic alignment element 44c by the rivets 26c. The support member 46c is rotatably connected with the first sub magnetic alignment element 42c and the second sub magnetic alignment element 44c, so the magnetic assembly 20c may be switched between the folded state and the unfolded state by rotating the support member 46c. The support member 46c may include a material being capable of coupling with a magnet, such as magnet or iron, and be configured as a third sub magnetic alignment element, or the support member 46c

A thickness of the first sub magnetic alignment element 42c or the second sub magnetic alignment element 44c is 0.3-4 mm, and a thickness of the magnetic assembly 20c is 1-5 mm. An inner diameter of the first sub magnetic alignment element 42c or the second sub magnetic alignment element 44c is 40-52 mm, and an inner diameter of the magnetic assembly 20c is about 38-50 mm. An outer diameter of the first sub magnetic alignment element 42c or the second sub magnetic alignment element 44c is 48-60 mm, and an outer diameter of the magnetic assembly 20c is about 50-62 mm. The first sub magnetic alignment element 42c and/or the second sub magnetic alignment element 44c defines a magnetic coupling area, a vertical distance between a center of the magnetic coupling area and a top edge of the back wall 11c is about 77-97 mm, and a horizontal distance between a center of the magnetic coupling area and a side edge of the back wall 11c is about 40-52 mm. At least a portion of the support member 46c is capable of rotating relative to the case or the electronic device to define an angle with the case or the electronic device, and the angle is 0-135°.

In the embodiment, the outer surface of the housing 10c defines an annular receiving space 22c, the first sub magnetic alignment element 42c and the second sub magnetic alignment element 44c are fixed in the receiving space 22c. When the magnetic assembly 20c is in the folded state, the support member 46c is received in the receiving space 22c; when the magnetic assembly 20c is in the unfolded state, the support member 46c is rotated away from the receiving space 22c.

Preferably, the first sub magnetic alignment element 42c, the second sub magnetic alignment element 44c and the support member 46c cooperatively form an arc-shaped structure and locate on a same ring with an inner diameter of 40-56 mm, position, shape, size of the ring correspond to the position, shape, size of a wireless charging module of the wireless charger. Preferably, the first sub magnetic alignment element 42c, the second sub magnetic alignment element 44c, and the support member 46c may be magnetic sheets, such as iron sheets or magnetic sheets, to strengthen the magnetic effect, which can not only prevent the mobile phone from slipping off the wireless charger during charging, but also strengthen a precise positioning between the mobile phone and the wireless charger to ensure the charging effect.

Preferably, the support member 46c is substantially a half ring, user's fingers may insert in a semicircular space 25c of the support member 46c when the magnetic assembly 20c is in the folded state, so the case 100c can also be easily held by hand. The first sub magnetic alignment element 42c and the second sub magnetic alignment element 44c cooperatively form another half ring, and an isolating gap 48c is defined between the first sub magnetic alignment element 42c and the second sub magnetic alignment element 44c, and the first sub magnetic alignment element 42c, the second sub magnetic alignment element 44c, and the support member 46c form an open ring, for avoiding an interference on the magnetic field and improving the wireless charging effect.

The first connector 43c and the second connector 45c have also a sheet-like structure. The housing 10c defines a plurality of through holes 24c through which the rivets 26c pass through. an isolating gap 49c is formed between the first connector 43c and the second connector 45c, and the isolating gap 49c faces the isolating gap 48c.

It should be understood that the first connector 43c, the second connector 45c, the first sub magnetic alignment element 42c, and the second sub magnetic alignment element 44c may also be disposed on the same side of the housing 10c. The housing 10c of different materials can be connected with the first sub magnetic alignment element 42c and the second sub magnetic alignment element 44c more closely by the first connector 43c and the second connector 45c. Further, the first sub magnetic alignment element 42c, the second sub magnetic alignment element 44c may also be connected to the housing 10c by other means, such as embedded in the housing 10c by injection molding, or fixed in the housing 10c by tight fit.

Preferably, each of the first connector 43c and the second connector 45c is covered with a decorative member 47c, the decorative member 47c has a circular structure, and defines an isolating gap 470c corresponding to the isolating gap 49c. The decorative member 47c may be made of metal, plastic, wood, ceramics, or other materials, which not only plays a decorative effect, but also does not affect the wireless charging. Preferably, the inner side of the housing 10c is recessed to a certain depth to receive the first connector 43c, the second connector 45c and the decorative member 47c, the outer surface of the decorative member 47 is flush with the outer side of the housing 10c, for improving the appearance of the housing 10c and reducing the overall thickness of the housing 10c.

Preferably, the thicknesses of the first sub magnetic alignment element 42c, the second sub magnetic alignment element 44c, and the support member 46c are comparable, and the outer surfaces of the three are flush with each other when in the folded state, so that the outer side of the case 100c is flat, and may fit on the wireless charger. Preferably, in the folded state, the outer surfaces of the first sub magnetic alignment element 42c, the second sub magnetic alignment element 44c, and the support member 46c are not lower than the outer surface of the housing 10c. For example, the outer surfaces of the first sub magnetic alignment element 42c, the second sub magnetic alignment element 44c, and the support member 46c are flush with the outer surface of the housing 10c, when in use the outer surface of the housing 10c is attached to the charging base to enhance the magnetic effect.

In the embodiment, the magnetic assembly 20c further includes two damping members 50c, two ends of the support member 46c are respectively connected to the first sub magnetic alignment element 42c and the second sub magnetic alignment element 44c through the damping members 50c in damping manners. So that when the support member 46c rotates a preset angle, the support member 46c can be automatically held at the preset angle.

The damping member 50c includes a first damping portion 52c, a second damping portion 54c, and a rotating element 56c connecting with the first damping portion 52c and the second damping portion 54c in series, one side of the first damping member 52c is riveted with the first sub magnetic alignment element 42c or the second sub magnetic alignment element 44c, the other side is wound to form a first pivot hole 53c. One side of the second damping portion 54c is riveted with the support member 46c, and the other side is wound to form a second pivot hole 55c. Two ends of the rotating element 56c are plugged into the first pivot hole 53c and the second pivot hole 55c respectively and damped with inner walls of the first pivot hole 53c and the second pivot hole 55c, so that the support member 46c may be automatically fixed by friction after rotation, and the support member 46c may not rotate automatically without an external force. An angle α of 30-60° is defined between an axis A of the rotating element 56c and an axis B of the back wall 11c.

In the folded state, the support member 46c is received in the receiving space 22c of the housing 10c, and the case 100c may be placed flat on the charger for charging, or placed on a support such as a tabletop, or may be placed in a bag, pocket to carry, or held in the hand. In the folded state, the support member 46c rotates over and extends out of the receiving space 22c, forming a triangular support with the housing 10c, to keep the mobile phone in an inclined state for use.

Preferably, the middle position of the outer surface of the support member 46c is recessed to form an operation portion 460c, which is convenient for user to lift the support member 46c. Preferably, the rotating element 56c is inclined at 45° relative to the back wall 11c of the housing 10c. In this way, after the moving member 46c rotates outward, an angle is formed between the moving member 46c and the mobile phone, for strengthening the stability of the housing 10c. The moving member 46c may not rotate even when the edge of the mobile phone is gently pressed.

The magnetic assembly 20c has a strong magnetic effect, so that the mobile phone and the wireless charger can be stably connected and accurately aligned by the magnetic assembly 20c, to ensure the wireless charging effect. In addition, the support member 46c of the magnetic assembly 20c can be used as of a bracket for the mobile phone so as to keep the mobile phone in an inclined state, which is convenient to use.

As shown in FIGS. 26-35, the present disclosure provides a case 100d according to a fourth embodiment, which may be used to support electronic devices. The fourth embodiment takes the mobile phone as an example. The case 100d includes a housing 10d, a magnetic assembly 20d rotatably connected to the housing 10d. The magnetic assembly 20d includes a support member 11d having a ring shape, a magnetic alignment member 13d, and a connecting member for rotatably connecting the magnetic alignment member 13d with the housing 10d. The connecting member includes a first clamping part 12d connected with the magnetic alignment member 13d.

A thickness of the magnetic alignment member 13d is 0.3-4 mm, and a thickness of the magnetic assembly 20d is 1-5 mm. An inner diameter of the magnetic alignment member 13d is 40-52 mm, and an inner diameter of the magnetic assembly 20d is about 38-50 mm. An outer diameter of the magnetic alignment member 13d is 48-60 mm, and an outer diameter of the magnetic assembly 20d is about 50-62 mm. The magnetic alignment member 13d defines a magnetic coupling area, a vertical distance between a center of the magnetic coupling area and a top edge of the back wall of the housing 10d is about 77-97 mm, and a horizontal distance between a center of the magnetic coupling area and a side edge of the back wall of the housing 10d is about 40-52 mm. At least a portion of the support member 11d is capable of rotating relative to the case or the electronic device to define an angle with the case or the electronic device, and the angle is 0-135°.

The support member 11d has a first circular inner wall and a first circular outer wall, a first surface 111d located between the first circular inner wall and the first circular outer wall, and a second surface 112d opposite to the first surface 111d. The first clamping part 12d has a fixed end 121d and a free end 122d, the fixed end 121d is connected to the support member 11d, the free end 122d is located on a side of the fixed end 121d near the first circular inner wall of the support member 11d and can rotate elastically around the fixed end 121d. The free end 122d defines a first clamping groove 123d, the magnetic alignment member 13d is clamped in the first clamping groove 123d. The magnetic alignment member 13d may rotate towards or away from the first clamping groove 123d.

One end of the magnetic alignment member 13d is rotatably connected with the support member 11d. For example, when the magnetic assembly 20d is in the folded state, the magnetic alignment member 13d is superimposed on the support member 11d; when the magnetic assembly is in the unfolded state, the magnetic alignment member 13d rotates around the support member 11d and forms an angle with the support member 11d for supporting the mobile phone.

The magnetic alignment member 13d is ring shaped and has a second inner wall and a second outer wall opposite to the second inner wall, and the magnetic alignment member 13d defines an isolating gap 133d. The isolating gap 133d is located, for example, in a side of the magnetic alignment member 13d away from the first clamping part 12d. Of course, a rotating connection between magnetic alignment member 13d and the support member 11d through the first clamping part 12d is only an example of the present disclosure, the magnetic alignment member 13d may also be rotatably connected with the support member 11d by a shaft pin, etc., the present disclosure does not limit to the modes of the rotating connection. The support member 11d and the magnetic alignment member 13d form a circular sheet structure, the support member 11d may have a ring shape, but may also have other shapes, the size of the magnetic alignment member 13d can adapt to the size of the Mag-safe on the market, the magnetic alignment member 13d may be made of iron or other magnetic metals. The first isolating gap 133d is defined in the magnetic alignment member 13d, so that the magnetic alignment member 13d is not a complete metal ring, which can reduce heat generated during charging and improve the charging effect when coupled with the magnetic wireless charger. In one embodiment, the case 100d further includes an isolating member 14d disposed in the isolating gap 133d. The charging effect is ensured, and the aesthetics and stability of the case 100s are also improved. The support member 11d may be made of metal iron or non-metallic material. When the support member 11d is made of iron or other magnetic metal materials, the case 100d may absorb the magnet of the mobile phone without an adhesive, and the case 100d can be separated from the mobile phone at any time. Similarly, when the support member 11d is made of metal, the support member 11d also has a second isolating gap 114d corresponding to the first isolating gap 133d, which is also used to improve the charging effect. The first clamping part 12d may be made of metal shrapnel or other materials with an elastic deformation property. The first clamping part 12d can be integrated with the support member 11d. An angle between a center line of the isolating gap 133d and a center line of the magnetic alignment member 13d is no more than 5 degrees.

When using the case 100d, the second surface 112d of the support member 11d may be adhered to the back of the mobile phone. In the folded state, the magnetic alignment member 13d is arranged on the first surface 111d of the support member 11d, basically coincided with the support member 11d. At this time, the free end 122d of the first clamping part 12d tightly clamps the magnetic alignment member 13d, the magnetic alignment member 13d may remain in the folded state in the absence of external force. When it is necessary to unfold the case 100d, one end of the magnetic alignment member 13d rotates away from the first surface 111d, at this time the first clamping part 12d is elastically deformed and the free end 122d may upwarp (that is, the free end 122d rotates around the fixed end 121d away from the first surface 111d). When the magnetic alignment member 13d rotates to a suitable angle relative to the support member 11d, the support effect can be achieved. When it is necessary to fold the case 100d, the magnetic alignment member 13d rotates in the direction close to the first surface 111d until it fits with the support member 11d, at this time the first clamping part 12d is elastically deformed again, and the magnetic alignment member 13d is fastened to the support member 11d.

The case 100d in the present disclosure adopts a shaftless rotating structure, by the rotation connection between the support member 11d and the magnetic alignment member 13d is achieved by a clamp, when the case 100d is folded, the thickness of the back wall of the case 100d is approximately equal to a sum of the thicknesses of the support member 11d and the magnetic alignment member 13d, the free end 122d of the first clamping part 12d may upwarp when the case 100d is unfolded, which may provide a space for the magnetic alignment member 13d to rotate and provide an appropriate damping. Therefore, the case 100d is simple in structure, light, and thin.

More specifically, the support member 11d defines a first clamping hole 113d passed through the first surface 111d and the second surface 112d. The free end 122d is located in the first clamping hole 113d and includes a first side wall 1231d, a first bottom wall 1232d and a second side wall 1233d. The first side wall 1231d is connected to the fixed end 121d and extends upwards. The first bottom wall 1232d is connected to the end of the first side wall 1231 away from the fixed end 121d and extends away from the fixed end 121d. The second side wall 1233d is connected to the end of the first bottom wall 1232d away from the first side wall 1231d and extends downwards. The magnetic alignment member 13d includes a clamping section 131d recessed towards the first clamping hole 113d, and a second clamping hole 132d defined between the clamping section 131d and the inner wall of the magnetic alignment member 13d. The clamping section 131d is clamped between the first side wall 1231d and the second side wall 1233d, and the second side wall 1233d is passed through the second clamping hole 132d.

The first clamping hole 113d is defined between the first circular inner wall and the first circular outer wall, the free end 122d is clamped in the first clamping hole 113d, the first side wall 1231d, the first bottom wall 1232d and the second side wall 1233d enclose the first clamping groove 123d, and an opening of the first clamping groove 123d faces downwards, that is, the opening of the first clamping groove 123d faces towards the support member 11d. The clamping section 131d is sunken downward (referring to FIG. 31), and the second clamping hole 132d is defined between the clamping section 131d and the second circular inner wall. The second side wall 1233a of the first clamping groove 123d passes through the second clamping hole 132, so the clamping section 131d is clamped into the first clamping hole 113d by the first side wall 1231d, the first bottom wall 1232d and the second side wall 1233d, so the support member 11d is clamped with the magnetic alignment member 13d. When the magnetic alignment member 13d rotates away from the first surface 111a, the clamping section 131d is erected, and the second clamping hole 132d sleeves on the first bottom wall 1232s. A width of the clamping section 131d in the radial direction of the magnetic alignment member 13d is greater than a width of the second side wall 1233d along a direction from the first surface 111d to the second surface 112d, the width of the first bottom wall 1232d in the radial direction of the magnetic assembly 10d is greater than or equal to a thickness of the clamping segment 131d in the radial direction of the magnetic alignment member 13d, so that when the magnetic alignment member 13d is in the unfolded state, the free end 122d of the first clamping part 12d is erected. A depth of the clamping section 131d is less than or equal to a thickness of the support member 11d. A thickness of the first bottom wall 1232 along a direction the first surface 111d to the second surface 112d is less than or equal to a thickness of the support member 11d. Thus, when the magnetic alignment member 13d is folded, the thickness of the case 100d is substantially equal to a sum of the thicknesses of the support member 11d and the magnetic alignment member 13d.

The magnetic alignment member 13d further includes a first end 137d, a second end 138d, a second buckle 134d, and a third buckle 135d, the first isolating gap 133d is defined between the first end 137d and the second end 138d, the second buckle 134d is connected to the first end 137d and extends in the first isolating gap 133d, the third buckle 135d is connected to the second end 138d and extends in the first isolating gap 133d. The magnetic alignment member 13d may be clamped in the second isolating gap 114d by the second buckle 134d and the third buckle 135d, so that the magnetic alignment member 13d is clamped in the support member 11d. The magnetic alignment member 13d in the folded state may be fixed by the support member 11d to prevent an accidental opening.

Further, the case 100d further includes an isolating member 14d, the isolating member 14d includes a cover plate 141d, and two protrusions 142d, the cover plate 141d is disposed in the first isolating gap 133d, the protrusion 142d are respectively inserted in the second buckle 134d and the third buckle 135d. For example, in one embodiment, the second buckle 134d and the third buckle 135d have the same structure and symmetrically disposed. The second buckle 134d specifically includes a third side wall 1341d, a second bottom wall 1342d and a fourth side wall 1343d. The third side wall 1341d is connected to the first end 137d and received in the second isolating gap 114d. The second bottom wall 1342d is connected to a side of the third side wall 1341d away from the first end 137d and extended towards the second end 138d. The fourth side wall 1343d is connected to a side of the second bottom wall 1342d away from the third side wall 1341d, extended towards the support member 11d. The protrusion 142d specifically includes a first protrusion 1421d and a second protrusion 1422d. The first protrusion 1421d is arranged between the second buckle 134d and the third buckle 135d, and the second protrusion 1422d is arranged between the third side wall 1341d and the fourth side wall 1343d. The third side wall 1341d also has a third opening 1344d, for example, and the second side wall 1342d has a fourth opening 1345d communicated with the third opening 1344d. The protrusion 142d further includes a sub protrusion 1423d, and the sub protrusion 1423d is disposed on a side of the second protrusion 1422d away from the cover plate 141d, and is received in the third opening 1344d and the fourth opening 1345d. The second buckle 134d may be a groove enclosed by the third side wall 1341d, the second bottom wall 1342d and the fourth side wall 1343d, and an opening of the groove faces upwards (in the direction away from the support member 11d). The third opening 1344d and the fourth opening 1345d are coupled to form an L-shaped hole. The third buckle 135d may be the same as the second buckle 134, the protrusion 142d includes a protrusion similar to the second protrusion 1422d and mated with the third buckle 135d, and a protrusion similar to the third protrusion 1423d and mated with an opening in the third buckle 135d. By clamping the isolating member 14d with the second buckle 134d and the third buckle 135d, the magnetic alignment member 13d is also clamped by the second buckle 134d and the third buckle 135d, the structure of the case 100d is stable and beautiful. The cover plate 141 further has a handle such as a groove or a through hole to facilitate the rotating of the magnetic alignment member 13d.

In one embodiment, the support member 11d defines at least one limit slot 115d passed through the first surface 111d and the second surface 112d. The magnetic alignment member 13d includes at least one limit member 136d protruded from the second annular outer wall, and the limit member 136d is inserted in the limit slot 115d. Two long strip shaped limit slots 115d are provided on both sides of the first fastener 12, when the magnetic alignment member 13d is attached to the support member 11d, the limit members 136d are inserted horizontally into the limit slots 115d. However, when the magnetic alignment member 13d is unfolded, the limit member 136d are diagonally inserted in the limit slots 115d; when the magnetic alignment member 13d rotates to a certain angle, the end of the limit member 136d away from the second annular inner wall is resisted in the limit slot 115d to limit the angle of the magnetic alignment member 13d.

Referring to FIGS. 36 to 41, the present disclosure provides a case 100e according to a fifth embodiment. The case 100e is used to accommodate an electronic device and/or cooperate with an external wireless charger to wirelessly charge the electronic device. Optionally, the electronic device may be mobile phone, pad and other mobile devices. The fifth embodiment takes the mobile phone as an example.

The case 100e includes a housing 100e and a magnetic assembly 200e. The housing 100e includes a back wall 11e and a side wall 12e, the back wall 11e and the side wall 12e cooperatively define a receiving cavity 101e for receiving the mobile phone. The magnetic assembly 200e includes a support member 210e, an isolating member 220e received in the support member 210e, a connecting member 800e, and a magnetic alignment member 900e connected with the support member 210e, the connecting member 800e is configured for rotatably connecting the magnetic alignment member 900e with the support member 210e. The magnetic alignment member 900e includes a first sub magnetic alignment element 300e and a second sub magnetic alignment element 400e connected with the first sub magnetic alignment element 300e, the first sub magnetic alignment element 300e and the second sub magnetic alignment element 400e may be magnets, irons, or the like. The magnetic assembly 200e is polygonal shaped. In detail, the magnetic assembly 200e is triangular shaped, quadrangular shaped, pentagonal shaped, hexagonal shaped, heptagonal shaped, octagonal shaped, trapezoidal shaped, and so on.

A thickness of the magnetic alignment member 900e is 0.3-4 mm, and a thickness of the magnetic assembly 200e is 1-5 mm. An inner diameter of the magnetic alignment member 900e is 40-52 mm, and an inner diameter of the magnetic assembly 200e is about 38-50 mm. An outer diameter of the magnetic alignment member 900e is 48-60 mm, and an outer diameter of the magnetic assembly 200e is about 50-62 mm. The magnetic alignment member 900e defines a magnetic coupling area, a vertical distance between a center of the magnetic coupling area and a top edge of the back wall 11e is about 77-97 mm, and a horizontal distance between a center of the magnetic coupling area and a side edge of the back wall 11e is about 40-52 mm. At least a portion of the support member 210e is capable of rotating relative to the case or the electronic device to define an angle with the case or the electronic device, and the angle is 0-135°.

The magnetic assembly 200e has a ring-shaped regular hexagon structure, and includes a first side 201e and a second side 202e opposite to the first side 201e, and the first side 201e and the second side 202e are both parallel to two long sides of the housing 100e. Compared with a circle structure, the polygon structure is much easier for positioning. The support member 210e and the isolating member 220e cooperatively form the ring-shaped regular hexagon structure. The first sub magnetic alignment element 300e and the second sub magnetic alignment element 400e are arranged on the support member 210e and separated from each other by the isolating member 220e. The support member 210e is usually made of metal materials such as aluminum alloy, to improve the strength, lighten the weight, and avoid the deformation. The isolating member 220e may be made of plastic, to avoid an influence on charging.

Further, the back wall 11e of the housing 100e defines a receiving space 120e, the receiving space 120e has a ring-shaped regular hexagon structure, and the magnetic assembly 200e are rotatably received in the receiving space 120e. When the magnetic assembly 200e is in a folded state, an outer surface of the support member 210e is flush with an outer surface of the back wall 11e housing 100e, or an outer surface of the support member 210e is slightly higher than an outer surface of the housing 100e.

Further, a side of the support member 210e adjacent to the housing 100e defines a first receiving portion 211e and a second receiving portion 212e spaced from the first receiving portion 211e. The first sub magnetic alignment element 300e is arranged in the first receiving portion 211e and the second sub magnetic alignment element 400e is arranged in the second receiving portion 212e.

Further, the isolating member 220e is recessed inwards from an outside of the isolating member 220e in a radial direction of the magnetic assembly 200e, and defines an operation portion 221e which may be a groove or a through hole.

Further, the connecting member 800e includes a first connecting part 810e and a second connecting part 820e. The second connecting part 820e is connected with the first sub magnetic alignment element 300e and the second sub magnetic alignment element 400e. The first connecting part 810e is connected with a side of the second connecting part 820e away from the isolating member 220e. The second connecting part 820e is fixed connected with the magnetic alignment member 900e, the first connecting part 810e is rotatably connected with the back wall 11e, so the magnetic alignment member 900e may be rotatably connected with the back wall 11e. The first connecting part 810e may be a rotating element.

Further, the magnetic assembly 200e further includes a Myla piece 700e, configured to cover openings of the first receiving portion 211e and the second receiving portion 212e. The Myla piece 700e can decorate, beautify the case 100e, and protect the first sub magnetic alignment element 300e and the second sub magnetic alignment element 400e.

Further, the bottom of the receiving space 120e includes two positioning holes 130e, the support member 210e includes two positioning columns. The support member 210e can be fixedly connected with the housing 100e by the positioning hole 130e with the positioning column. The positioning column passes through the isolating member 220e and extends in the positioning hole 130e.

In the above embodiment, the first sub magnetic alignment element 300e includes a plurality of first magnetic alignment parts 310e received in the first receiving portion 211e, and the second sub magnetic alignment element 400e includes a plurality of second magnetic alignment parts 410e spaced in the second receiving portion 212e. On one hand, it can reduce the difficulty of manufacturing the first sub magnetic alignment element 300e and the second sub magnetic alignment element 400e. On the other hand, it can reduce the risk of fracture of the first sub magnetic alignment element 300e and the second sub magnetic alignment element 400e due to stress concentration when the magnetic assembly 200e is connected to the wireless charger.

Figure 42:
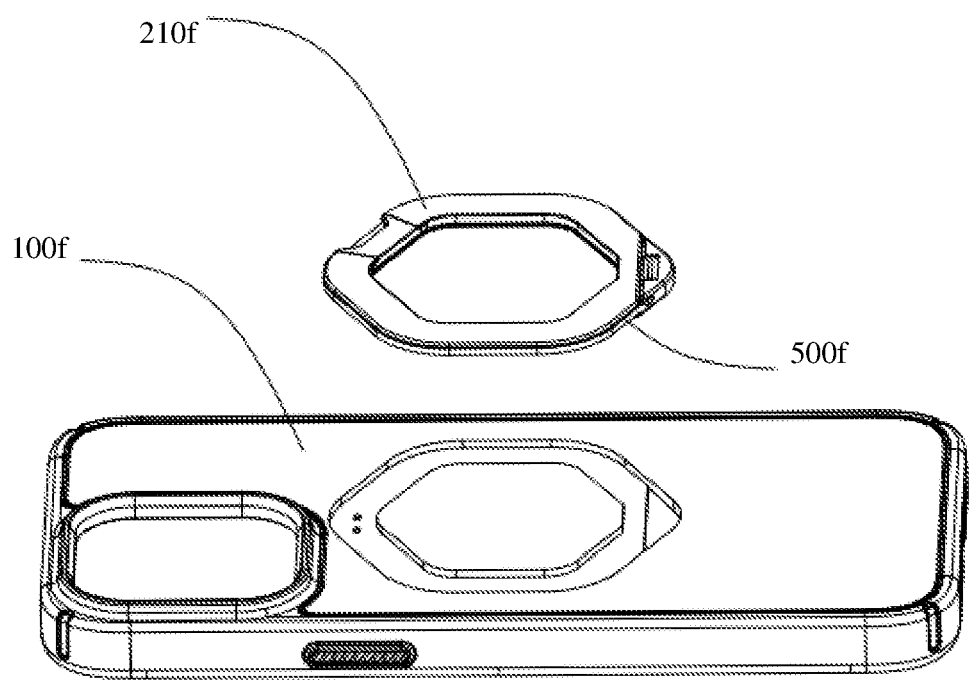
FIG. 42 is an exploded diagram of a case according to a sixth embodiment of the present disclosure.
Figure 43:
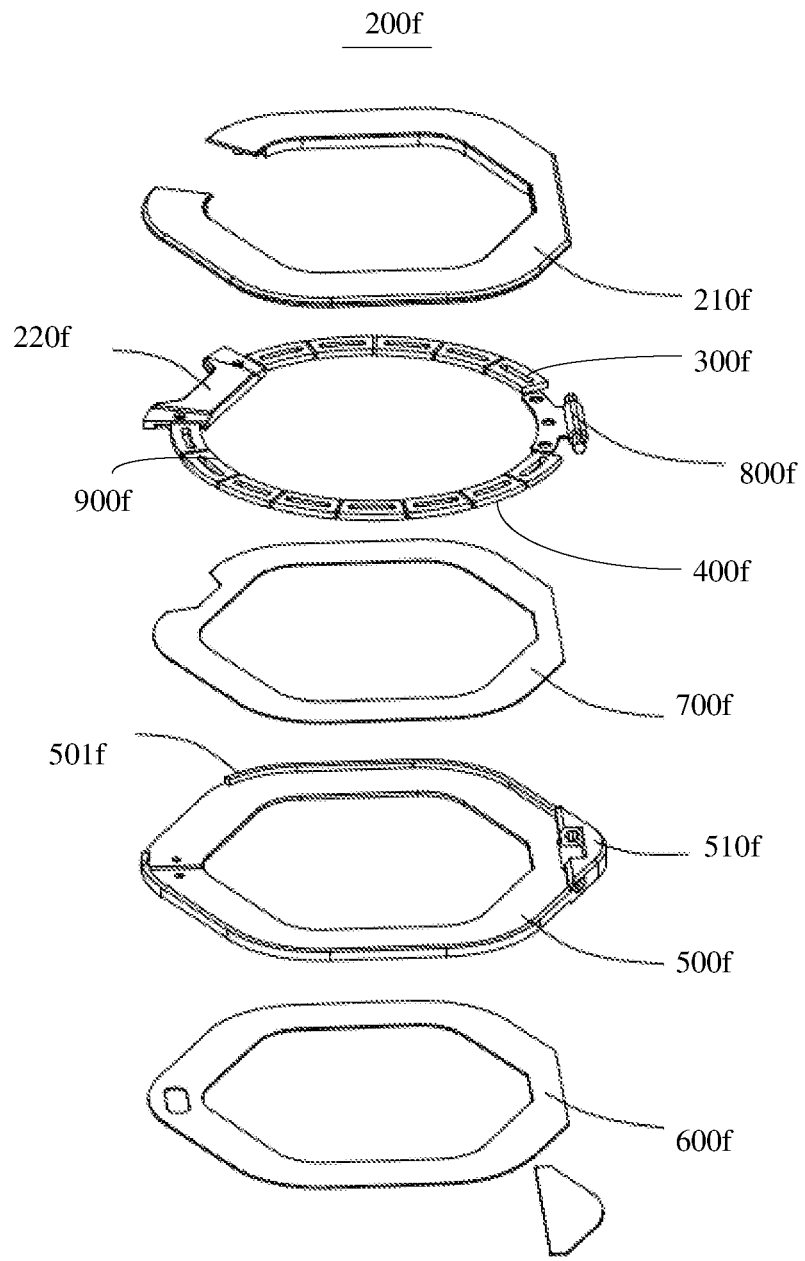
FIG. 43 is an exploded diagram of a magnetic assembly of FIG. 42.
Figure 44:
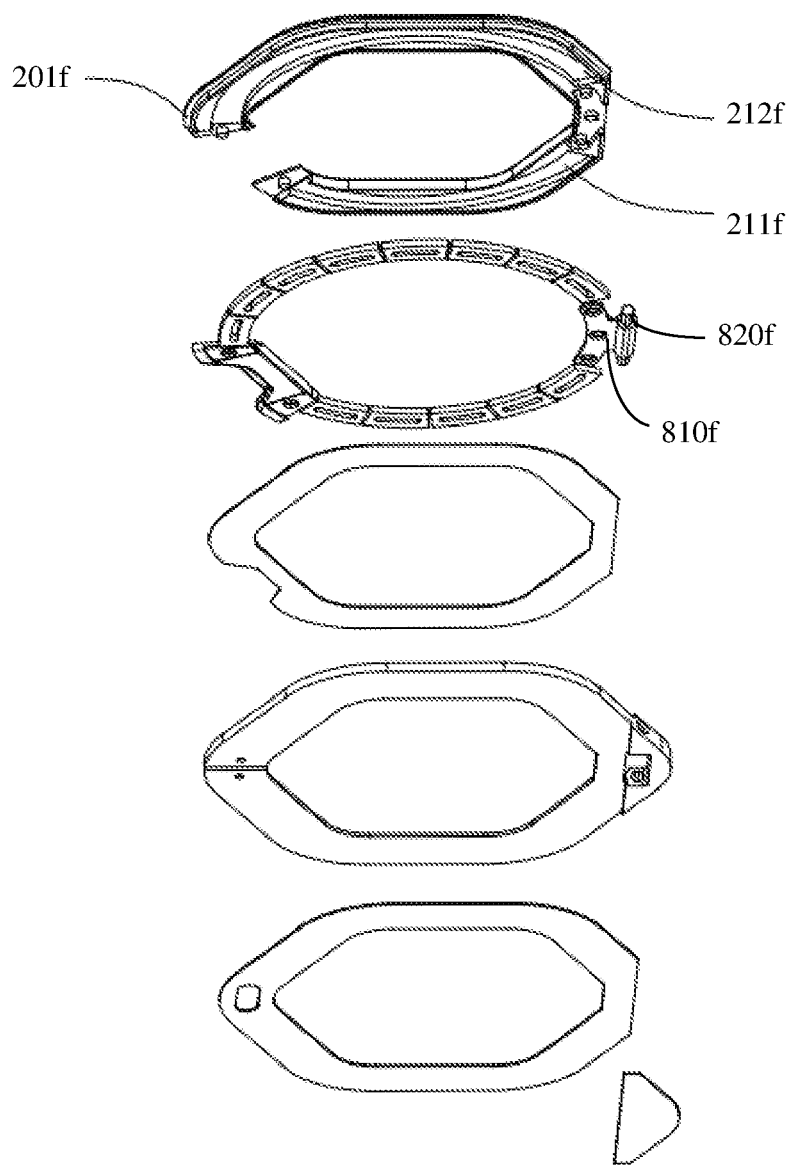
FIG. 44 is another exploded diagram of the magnetic assembly of FIG. 42.

Please referring to FIGS. 42-44, the present disclosure provides a case 100f according to a sixth embodiment, the case 100f is similar to the case 100e in structure. The differences between the case 100f and the case 100e at least include: the magnetic assembly 200f of the case 100f further includes a fixing member 500f, the support member 210f, the isolating member 220f, the fixing member 500f, the Myla piece 700f, the connecting member 800f and the magnetic alignment member 900f are all received in the receiving space 120f of the housing 100f, the fixing member 500f has a ring shaped polygonal structure, and the fixing member 500f is rotatably connected with the magnetic alignment member 900f.

A junction of two adjacent sides of the fixing member 500f is protruded with a fixing part 510f. In the embodiment, a rotation axis of the magnetic assembly 200f is inclined to the two adjacent sides of the fixing member 500f, for reducing the maximum stress on the magnetic assembly 200f and preventing a fracture of the magnetic assembly 200f during rotating.

Further, an adhesive layer 600f is arranged on a bottom of the receiving space 120f, and the fixing member 500f is fixedly received in the receiving space 120f through the adhesive layer 600f. The adhesive layer 600f may be double-sided tape or glue, etc.

Further, the connecting member 800f includes a first connecting part 810f and a second connecting part 820f. The second connecting part 820f is connected with the first sub magnetic alignment element 300f and the second sub magnetic alignment element 400f. The first connecting part 810f is connected with a side of the second connecting part 820f away from the isolating member 220f. The second connecting part 820f is fixed connected with the magnetic alignment member 900f, and the first connecting part 810f is rotatably connected with the support member 210f, so the magnetic alignment member 900f may be rotatably connected with the support member 210f. The fixing part 510f defines a hole defined in an axle direction of the fixing part 510f, and the first connecting part 810f is rotatably received in the hole. Specifically, the first connecting part 810f is cylindrical and the second connecting part 820f has a sheet structure. The second connecting part 820f can be fixed and connected with the support member 210f by welding or riveting. The first connecting part 810f may be a rotating element.

Further, one edge of the fixing member 500f away from the housing 10f is provided with at least one positioning bump 501f, and one side of the support member 210f defines at least one positioning slot 201f matched with the positioning bump 501f. When the support member 210f is rotated to overlap with the fixing member 500f, the positioning bump 501f is received in the positioning slot 201f, to align the wireless charger with the mobile phone.

Figure 45:
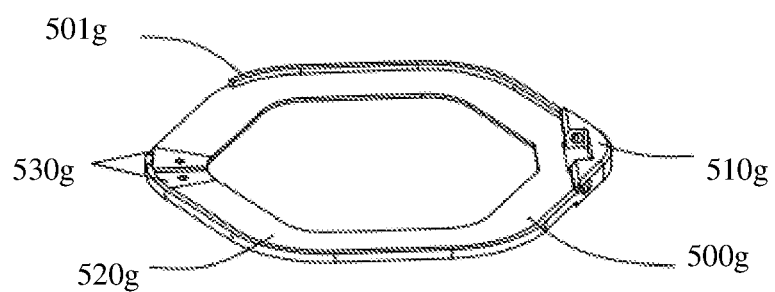
FIG. 45 is a structure diagram of a fixing member of a case according to a seventh embodiment of the present disclosure.
Figure 46:
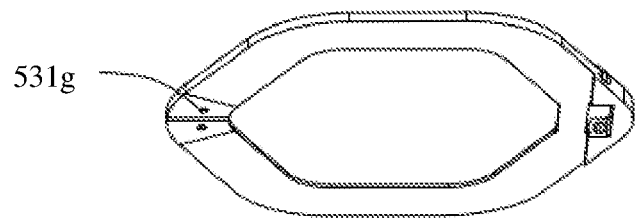
FIG. 46 is another structure diagram of the fixing member of FIG. 45.

Please referring to FIGS. 45-46, the present disclosure provides a case 100g according to a seventh embodiment, the case 100g is similar to the case 100f in structure. The differences between the case 100g and the case 100f at least include: the fixing member 500g includes a fixing part 520g and a separating part 530g, the fixing part 520g and the separating part 530g cooperatively form a ring shaped polygonized structure, the first sub magnetic alignment element 300g and the second sub magnetic alignment element 400g are arranged on the fixing part 520g and separated from each other by the separating part 530g, the separating part 530g may be made of plastic, or the separating part 530g defines a notch. Since the fixing part 520g is usually made of metal, the separating part 530 is arranged to avoid the fixing part 520g forming a closed metal ring structure, for avoiding an interference on the wireless charging magnetic field.

At least one edge of the fixing part 520g is protruded with a positioning protrusion 501g, the support member includes at least one positioning hole, the positioning protrusion 501g is received in the positioning hole, to connect the first fixing member with the fixing member 500g.

Further, the two ends of the separating part 530g are respectively provided with positioning holes 531g, and the housing 10g includes two positioning columns respectively fitted with two positioning holes 531g. The fixing member 500g can be fixedly connected with the housing 100g by the positioning hole 531g and the positioning column.

Figure 47:
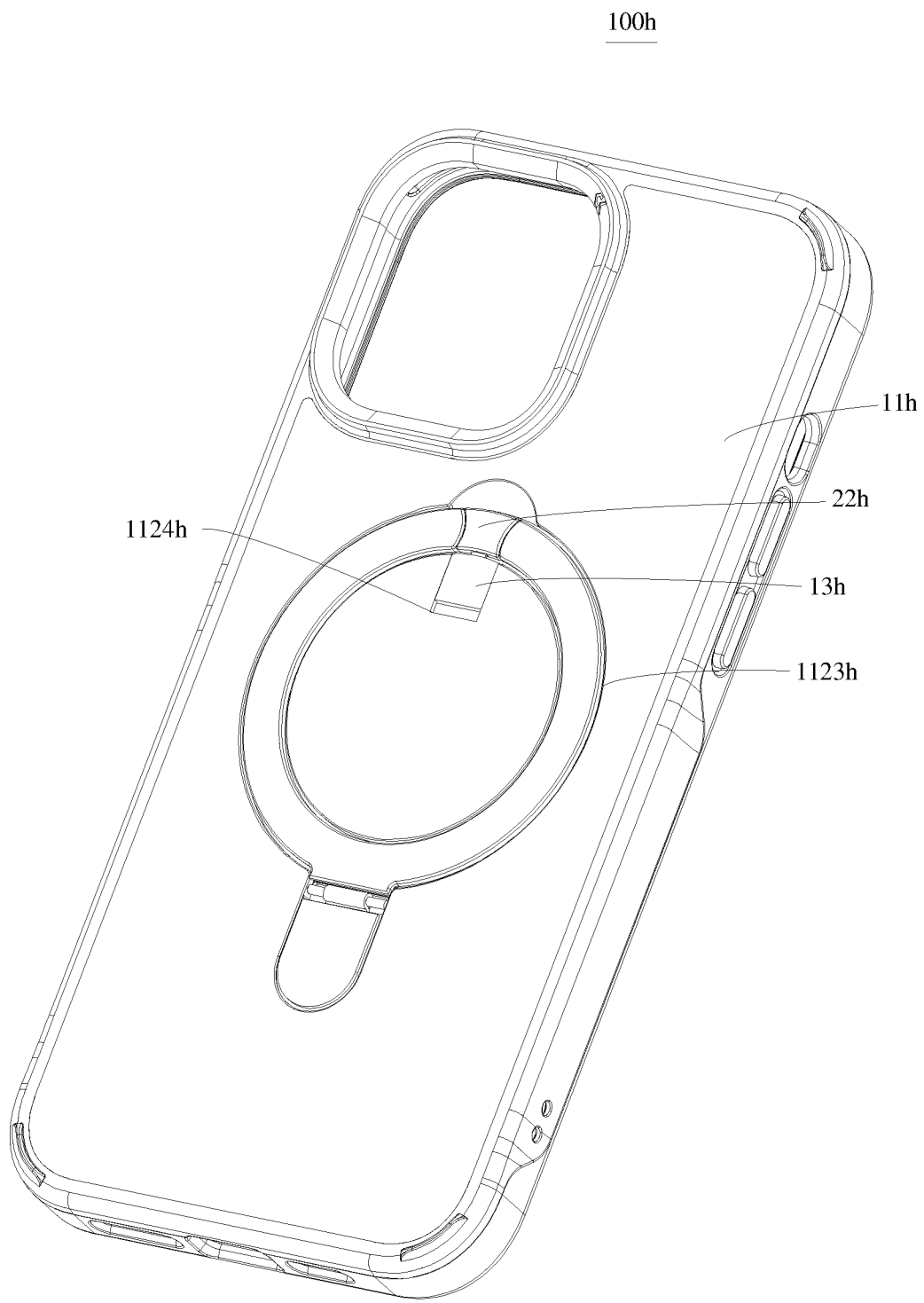
FIG. 47 is a structure diagram of a case according to an eight embodiment of the present disclosure.
Figure 48:
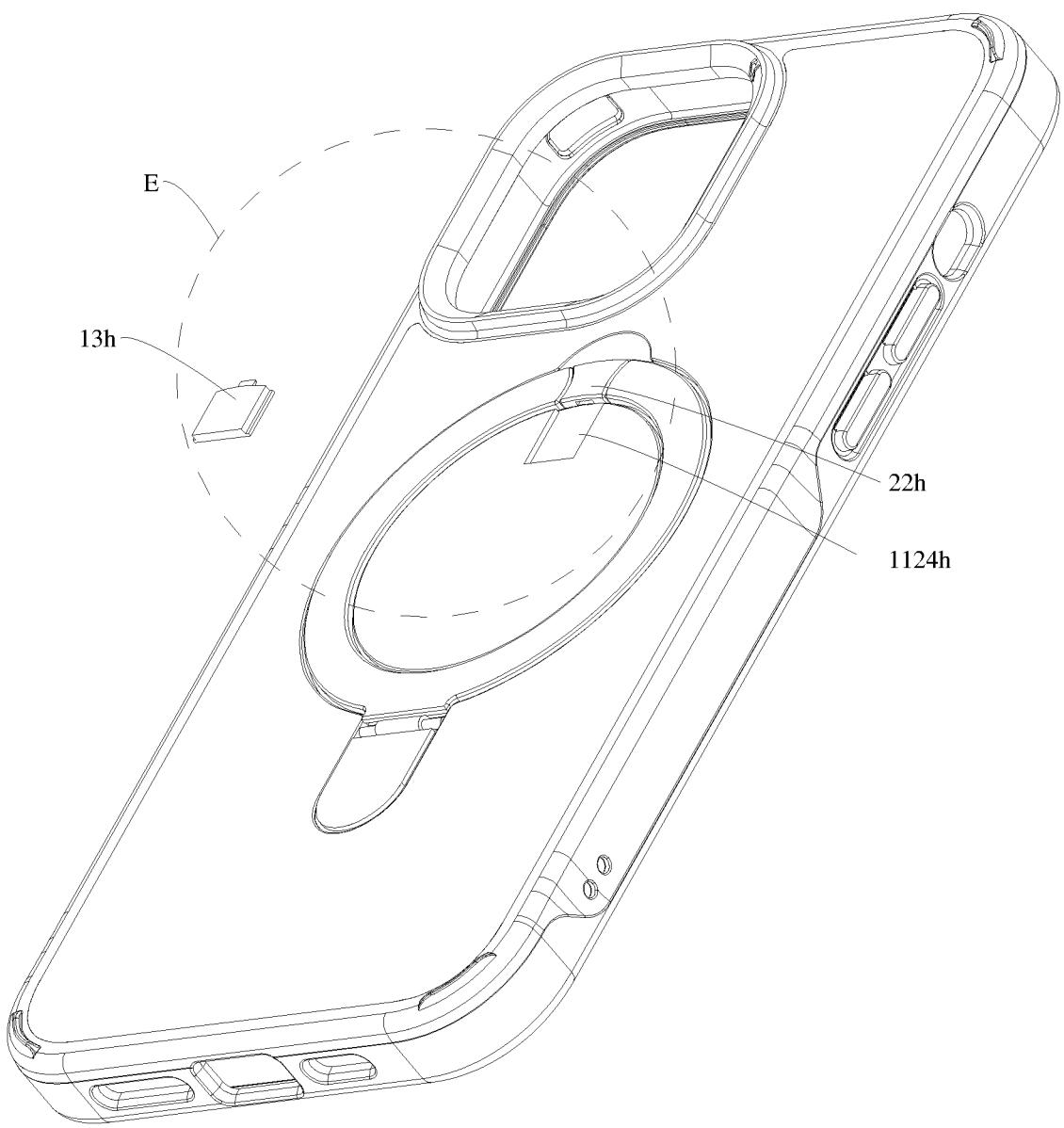
FIG. 48 is an exploded diagram of the case of FIG. 47.
Figure 49:
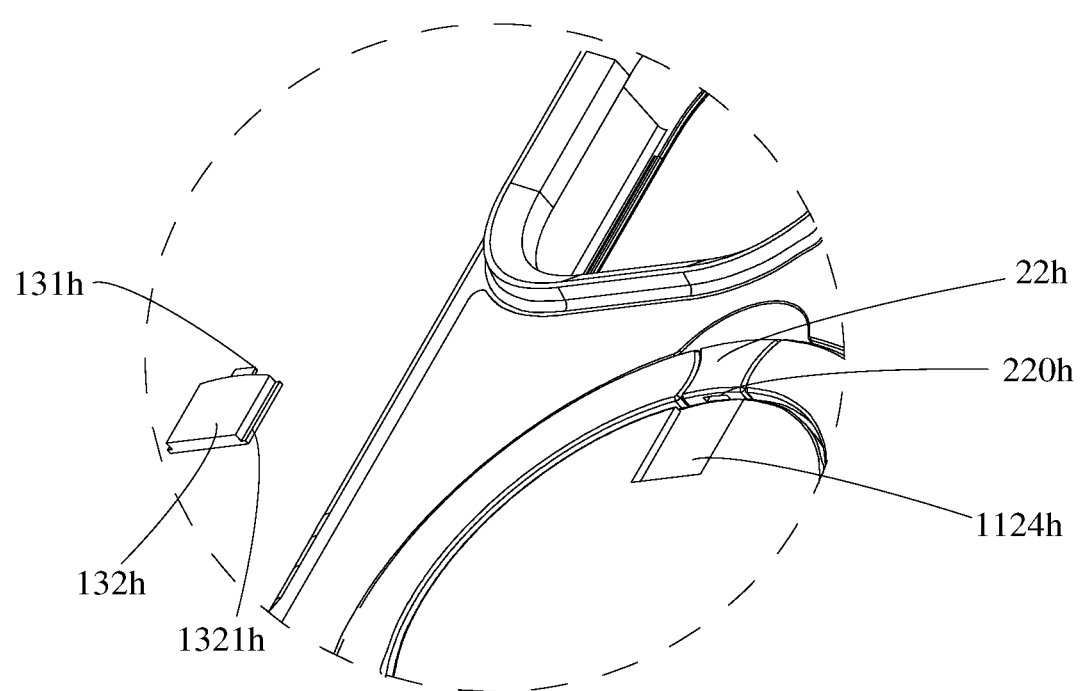
FIG. 49 is an enlarged diagram of portion E of FIG. 48.

Please referring to FIGS. 47-49, the present disclosure provides a case 100h according to an eight embodiment, the case 100h is similar to the case 100a in structure. The differences between the case 100h and the case 100a at least include: the case 100h further includes a locking member 13h, the back wall 11h defines an accommodating groove 1124h communicated with the receiving space 1123h, the locking member 13h includes a locking portion 131h and a connecting portion 132h, the isolating member 22h defines a locking hole 220h, the locking portion 131h is locked in the locking hole 220h when the isolating member 22h is arranged on the back wall 11h, the connecting portion 132h is received in the accommodating groove 1124h, the connecting portion 132h includes at least one step 1321h, a side wall of the accommodating groove 1124h defines at least one receiving hole (not shown), when the connecting portion 132h is received in the accommodating groove 1124h, the step 1321h is received in the receiving hole.

Figure 50:
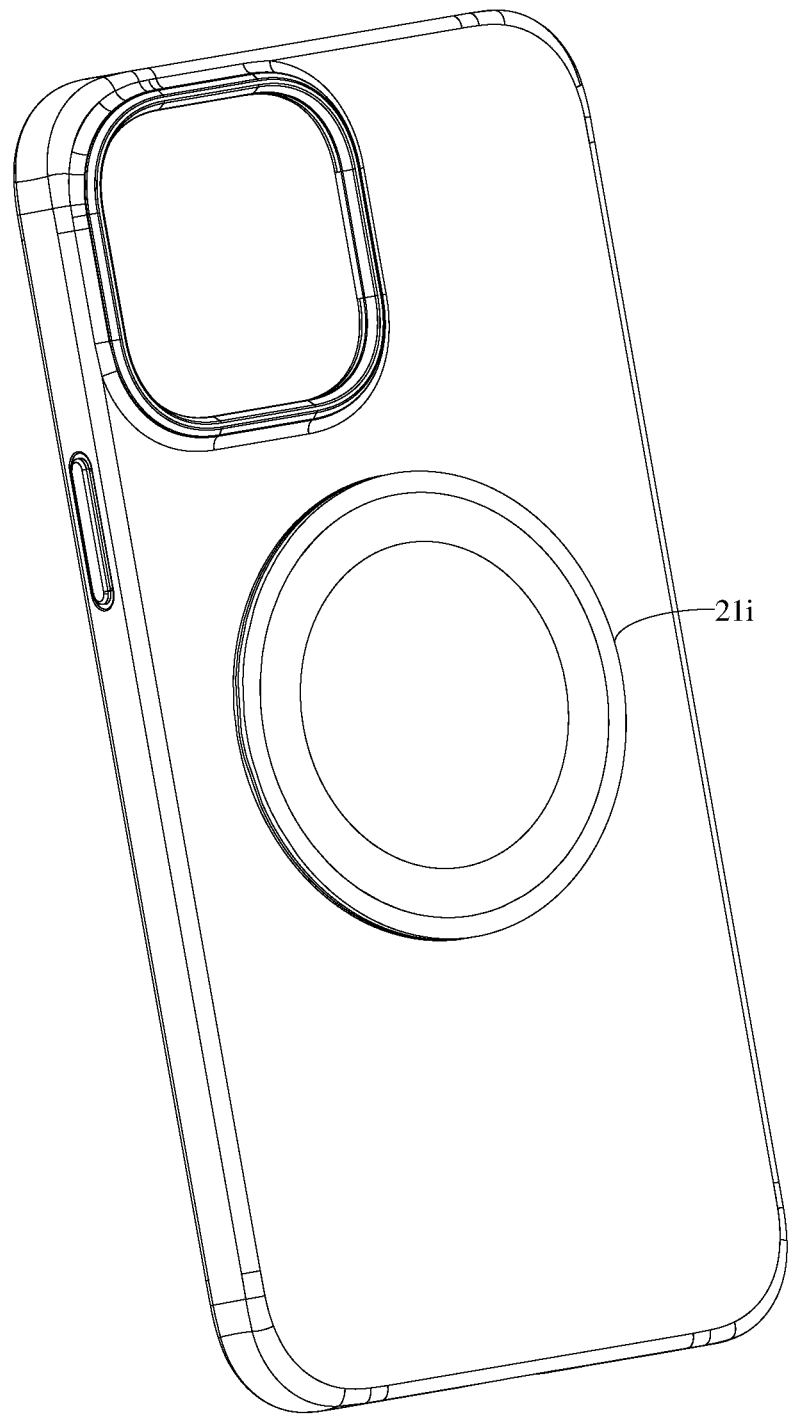
FIG. 50 is a structure diagram of a case according to a ninth embodiment of the present disclosure.
Figure 51:
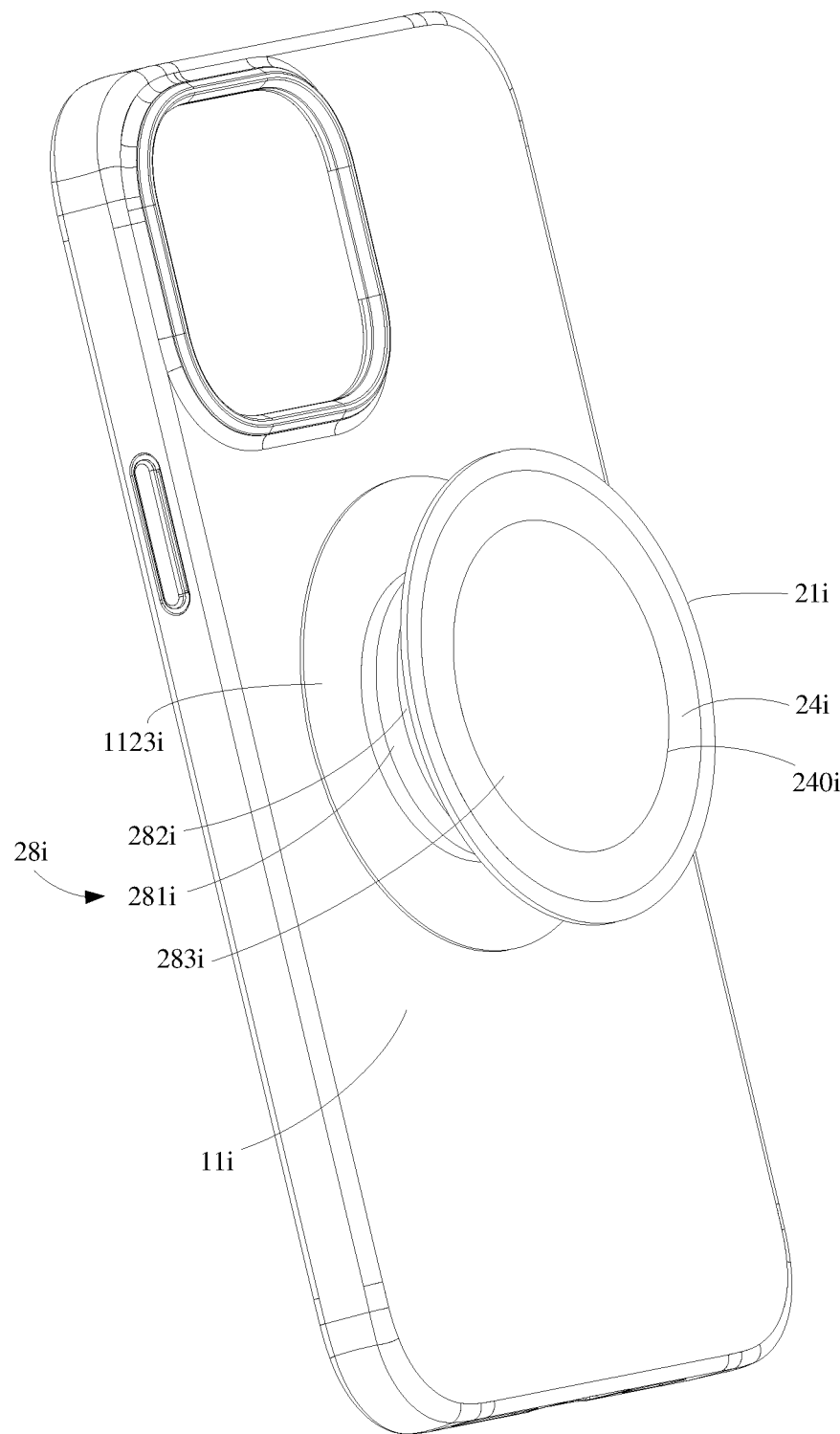
FIG. 51 is a structure diagram of the case of FIG. 50, and a connecting member of the case is in an elongated state.

Please referring to FIGS. 50-51, the present disclosure provides a case 100i according to a ninth embodiment, the case 100i is similar to the case 100a in structure. The differences between the case 100i and the case 100a at least include: the connecting member 28i is fixedly or detachably connected with the back wall 11i; at least a portion of the connecting member 28i is made of flexible material, such as rubber, flexiplast, silicone, or the like, and the connecting member 28*i* is capable of elongating and retracting relative to the back wall 11*i*; the magnetic assembly 20*i* is connected with the connecting member 28*i*, and the magnetic assembly 20*i* is capable of moving away from or moving towards the back wall 11*i* by the connecting member 28*i*.

The connecting member 28*i* is received in the receiving space 1123*i*. The connecting member 28*i* includes a first connecting section 281*i* fixedly or detachably connected with a bottom wall of the receiving space 1123*i*, a second connecting section 282*i* connected with the first connecting section 281*i*, and a third connecting section 283*i* connected with the second connecting section 282*i*. Sizes of the first connecting section 281*i* and the third connecting section 283*i* are greater than a size of the second connecting section 282*i*. The second connecting section 282*i* is made of the flexible material, and the connecting member 28*i* may be in an elongated state or a retracted state. The first connecting section 281*i* and the third connecting section 283*i* may be made of the flexible material.

The support member 21*i* sleeves around the magnetic alignment member 24*i*, and the magnetic alignment member 24*i* sleeves around the third connecting section 283*i*. The magnetic alignment member 24*i* defines a through hole 240*i* for receiving the third connecting section 283*i*. When the second connecting section 282*i* elongates, the second connecting section 282*i* moves the magnetic assembly 20*i*, so as to support the case 100*i*. When the second connecting section 282*i* retracts, the connecting member 28*i* may be at least partially received in the receiving space 1123*i*, and the magnetic assembly 20*i* may be at least partially received in the receiving space 1123*i* or arranged out of the receiving space 1123*i*.

The above description is merely some embodiments. It should be noted that for one with ordinary skills in the art, improvements can be made without departing from the concept of the present disclosure, but these improvements shall fall into the protection scope of the present disclosure.

What is claimed is:

1. A case for an electronic device, comprising:
    a side wall;
    a back wall, connected with the side wall to define a receiving cavity for receiving the electronic device; and
    a magnetic assembly, comprising:
        a support member, connected with the side wall or the back wall, and capable of moving relative to the side wall or the back wall, so as to support the case; and
        a magnetic alignment member, detachably or fixedly connected with the support member;
    wherein the support member defines a receiving portion, the magnetic alignment member is detachably or fixedly received in the receiving portion, the support member is moveable between a folded position and an unfolded position, when in the folded position, the support member is folded to the back wall; and when in the unfolded position, the case is supported by the support member at an angle relative to a support surface, the angle being adjustable by adjusting the unfolded position,
    wherein the support member comprises a mounting section at which the magnetic alignment member is mounted and a connecting section;
    the magnetic assembly further comprises a connecting element configured to pivotably connect the support member to the side wall or the back wall, the connecting element comprises a connecting portion stacked on the connecting section in a depth direction of the support member; and
    one of the connecting section and the connecting portion is provided with at least two fixing holes, and the other of the connecting section and the connecting portion is provided with at least two positioning protrusions engaged in the at least two fixing holes respectively in the depth direction of the support member.

2. The case for an electronic device according to claim 1, wherein the magnetic alignment member comprises a material being capable of coupling with a magnet.

3. The case for an electronic device according to claim 1, wherein an outer diameter of the magnetic alignment member is about 48-60 mm; or an outer diameter of the magnetic assembly is about 50-62 mm.

4. The case for an electronic device according to claim 1, wherein the magnetic alignment member defines a magnetic coupling area, wherein a vertical distance between a center of the magnetic coupling area and a top edge of the back wall is about 77-97 mm; or a horizontal distance between a center of the magnetic coupling area and a side edge of the back wall is about 40-52 mm.

5. The case for an electronic device according to claim 1, wherein the magnetic alignment member is substantially arc shaped or ring shaped.

6. The case for an electronic device according to claim 1, wherein the magnetic alignment member comprises:
    a plurality of sub magnetic alignment elements, spaced apart from each other, and the sub magnetic alignment elements cooperatively form a substantially ring shape or a substantially arc shape.

7. The case for an electronic device according to claim 1, wherein an outer periphery of the support member is polygonal shaped.

8. The magnetic assembly according to claim 1, wherein the connecting element further comprises a connecting tube extending out of the support member.

9. A case for an electronic device, comprising:
    a side wall;
    a back wall, connected with the side wall to define a receiving cavity for receiving the electronic device; and
    a magnetic assembly, comprising:
        a support member, connected with the back wall, and capable of moving relative to the back wall, so as to support the case; and
        a magnetic alignment member, detachably or fixedly connected with the support member;
    wherein the support member defines a receiving portion, the magnetic alignment member is detachably or fixedly received in the receiving portion, the support member is moveable between a folded position and an unfolded position,
    wherein the magnetic assembly further comprises a connecting member, the connecting member comprising:
        a rotating element; and
        a first connecting element, fixedly connected with the back wall, the support member and the first connecting element are rotatably connected with each other by the rotating element, wherein the back wall comprises a first surface and a second surface opposite to the first surface; the first surface defines a first connecting groove for mounting the first connecting element, the second surface defines a receiving space configured for receiving the support member; and
    wherein the back wall further defines an opening passed through the first surface and the second surface, the first connecting element comprises a first portion and a second portion, the first portion is received in the first connecting groove, the second portion is connected to the first portion and received in the opening, the rotating element passes through the second portion, and the receiving space, the second portion and the first portion are arranged sequentially in a longitudinal direction of the back wall.

10. A magnetic assembly comprising:
a connecting element configured to be connected to a housing; and
a ring-shaped support member pivotably connected to the connecting element, the ring-shaped support member comprising a mounting section and a connecting section,
wherein a magnetic alignment member is mounted at the mounting section and the connecting section is pivotably connected to the connecting element to thereby pivotably connect the ring-shaped support member to the connecting element,
wherein the mounting section comprise two arcuate parts for mounting the magnetic alignment member, and one of the two arcuate parts, the connecting section and the other of the two arcuate parts are arranged sequentially in a circumferential direction of the ring-shaped support member; and
wherein the magnetic assembly further comprises another connecting element configured to pivotably connect the ring-shaped support member to the connecting element, said another connecting element comprises a connecting portion which is stacked and fixed on the connecting section of the ring-shaped support member and pivotably connected to the connecting element via a shaft, and the connecting portion of said another connecting element is provided with at least two fixing holes, and the connecting section is provided with at least two positioning protrusions engaged in the at least two fixing holes respectively in the depth direction of the ring-shaped support member.

11. The magnetic assembly according to claim 10, wherein inner circumferential surfaces of the two arcuate parts and the connecting section are all located at an inner circumferential surface of a ring.

12. The magnetic assembly according to claim 11, wherein the mounting section is provided with a receiving groove in which the magnetic alignment member is mounted.

13. The magnetic assembly according to claim 12, wherein the magnetic alignment member comprises multiple segmented magnets accommodated in the receiving groove sequentially.

14. The magnetic assembly according to claim 10, wherein a side of the ring-shaped support member connected to the connecting element is formed with a protrusion which protrudes from a periphery of the ring-shaped support member.

15. The magnetic assembly according to claim 10, further comprising a protective layer which is configured for covering the connecting element, wherein the ring-shaped support member is foldable to be received in a ring receiving groove defined in the housing.

16. The magnetic assembly according to claim 10, further comprising a protective layer, wherein the protective layer made of a flexible film is connected to the ring-shaped support member and covers the magnetic alignment member.

17. A magnetic assembly comprising:
a connecting element configured to be connected to a housing; and
a ring-shaped support member pivotably connected to the connecting element, the ring-shaped support member comprising a mounting section and a connecting section,
wherein a magnetic alignment member is mounted at the mounting section and the connecting section is pivotably connected to the connecting element to thereby pivotably connect the ring-shaped support member to the connecting element, and
wherein the mounting section comprise two arcuate parts for mounting the magnetic alignment member, and one of the two arcuate parts, the connecting section and the other of the two arcuate parts are arranged sequentially in a circumferential direction of the ring-shaped support member; and
wherein the magnetic assembly further comprises another connecting element configured to pivotably connect the ring-shaped support member to the connecting element, said another connecting element comprises a connecting portion which is stacked and fixed on the connecting section of the ring-shaped support member and pivotably connected to the connecting element via a shaft, and a side surface of the connecting portion of said another connecting element adjacent to an inner periphery of the ring-shaped support member is arcuate.

18. A magnetic assembly comprising:
a connecting element configured to be connected to a housing; and
a ring-shaped support member pivotably connected to the connecting element, the ring-shaped support member comprising a mounting section and a connecting section,
wherein a magnetic alignment member is mounted at the mounting section and the connecting section is pivotably connected to the connecting element to thereby pivotably connect the ring-shaped support member to the connecting element;
wherein the mounting section comprise two arcuate parts for mounting the magnetic alignment member, and one of the two arcuate parts, the connecting section and the other of the two arcuate parts are arranged sequentially in a circumferential direction of the ring-shaped support member; and
wherein the magnetic assembly further comprises another connecting element configured to pivotably connect the ring-shaped support member to the connecting element, wherein the connecting section of the ring-shaped support member is sunken in a depth direction of the ring-shaped support member to form a mounting position, and said another connecting element comprises a connecting portion which is stacked and fixed on the mounting position and pivotably connected to the connecting element via a shaft.

19. The magnetic assembly according to claim 18, wherein the ring-shaped support member is provided with an operating portion;
a connecting line between a middle of the operating portion and a middle of the connecting member passes through a center of the ring-shaped support member; and
the operating portion is a notch recessed inwardly from an outer circumferential surface of the ring-shaped support member or the operating portion has a thickness less than that of other parts of the ring-shaped support member.

* * * * *